United States Patent
Hamada et al.

(10) Patent No.: US 12,459,174 B2
(45) Date of Patent: *Nov. 4, 2025

(54) INJECTION-MOLDED BODY AND PRODUCTION METHOD THEREFOR

(71) Applicant: DAIKIN INDUSTRIES, LTD., Osaka (JP)

(72) Inventors: Hiroyuki Hamada, Osaka (JP); Hayato Tsuda, Osaka (JP); Tadaharu Isaka, Osaka (JP); Yukari Yamamoto, Osaka (JP); Yumi Zenke, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 66 days.

This patent is subject to a terminal disclaimer.

(21) Appl. No.: 18/450,094

(22) Filed: Aug. 15, 2023

(65) Prior Publication Data

US 2023/0415387 A1   Dec. 28, 2023

Related U.S. Application Data

(63) Continuation of application No. PCT/JP2022/003643, filed on Jan. 31, 2022.

(30) Foreign Application Priority Data

Feb. 26, 2021 (JP) ................................. 2021-031094
Sep. 30, 2021 (JP) ................................. 2021-162125

(51) Int. Cl.
 B29C 45/00 (2006.01)
 B29K 27/12 (2006.01)
 B29K 27/18 (2006.01)

(52) U.S. Cl.
 CPC ...... *B29C 45/0001* (2013.01); *B29K 2027/12* (2013.01); *B29K 2027/18* (2013.01); *B29K 2995/0012* (2013.01)

(58) Field of Classification Search
 CPC .... B29C 2045/0027; B29C 2045/0029; B29C 2045/0037; B29C 2045/0049;
 (Continued)

(56) References Cited

U.S. PATENT DOCUMENTS

| 3,635,926 A | 1/1972 | Gresham et al. |
| 3,945,786 A | 3/1976 | Bishop |

(Continued)

FOREIGN PATENT DOCUMENTS

| CN | 1599757 A | 3/2005 |
| CN | 103946250 A | 7/2014 |

(Continued)

OTHER PUBLICATIONS

European Search Report issued Dec. 4, 2024 for European Patent Application No. 22759287.0.
(Continued)

*Primary Examiner* — Stella K Yi
(74) *Attorney, Agent, or Firm* — Sughrue Mion, PLLC

(57) ABSTRACT

Provided is an injection molded article containing a copolymer containing tetrafluoroethylene unit and a fluoro(alkyl vinyl ether) unit, wherein the content of the fluoro(alkyl vinyl ether) unit of the copolymer is 4.7 to 7.0% by mass with respect to the whole of the monomer units, the melt flow rate at 372° C. of the copolymer is 11.0 to 22.0 g/10 min, the melting point of the copolymer is 296 to 305° C., and the amount of fluorine ions dissolving out from the injection molded article into water is 7,500 μg/m² or lower.

11 Claims, 1 Drawing Sheet

(58) Field of Classification Search
CPC ........ B29C 2045/0094; B29C 45/0001; B29C 45/0025; B29C 45/0046; B29C 45/0062; B29C 45/03; B29C 45/08; B29C 45/16; B29C 45/1625
See application file for complete search history.

(56) References Cited

U.S. PATENT DOCUMENTS

| | | |
|---|---|---|
| 4,262,101 A | 4/1981 | Hartwimmer et al. |
| 4,414,356 A | 11/1983 | Michel |
| 4,510,300 A | 4/1985 | Levy |
| 4,743,658 A | 5/1988 | Imbalzano et al. |
| 4,902,444 A | 2/1990 | Kolouch |
| 5,000,875 A | 3/1991 | Kolouch |
| 5,656,392 A | 8/1997 | Sano et al. |
| 5,767,198 A | 6/1998 | Shimizu et al. |
| 5,851,693 A | 12/1998 | Sano et al. |
| 6,069,215 A | 5/2000 | Araki et al. |
| 6,096,795 A | 8/2000 | Abusleme et al. |
| 6,689,833 B1 | 2/2004 | Bidstrup et al. |
| 6,713,183 B2 | 3/2004 | Araki et al. |
| 6,740,375 B1 | 5/2004 | Sagisaka et al. |
| 6,774,196 B1 | 8/2004 | Taira et al. |
| 11,826,975 B2 | 11/2023 | Imamura et al. |
| 2002/0011692 A1 | 1/2002 | Lahijani |
| 2002/0099143 A1 | 7/2002 | Namura |
| 2003/0013791 A1 | 1/2003 | Blong et al. |
| 2003/0109646 A1 | 6/2003 | Kubo et al. |
| 2003/0114615 A1 | 6/2003 | Sumi et al. |
| 2003/0190530 A1 | 10/2003 | Yang et al. |
| 2003/0216531 A1 | 11/2003 | Aten et al. |
| 2004/0072935 A1 | 4/2004 | Blong et al. |
| 2004/0102572 A1 | 5/2004 | Kubo et al. |
| 2004/0204536 A1 | 10/2004 | Miyatani et al. |
| 2004/0260044 A1 | 12/2004 | Earnest, Jr. et al. |
| 2005/0020792 A1 | 1/2005 | Aoyama et al. |
| 2007/0112155 A1 | 5/2007 | Takase et al. |
| 2007/0149734 A1 | 6/2007 | Sakakibara et al. |
| 2007/0281166 A1 | 12/2007 | Nishio |
| 2008/0038627 A1 | 2/2008 | Yamauchi et al. |
| 2008/0114143 A1 | 5/2008 | Brothers et al. |
| 2009/0038821 A1 | 2/2009 | Sato et al. |
| 2009/0044965 A1 | 2/2009 | Kono et al. |
| 2009/0176952 A1 | 7/2009 | Funaki et al. |
| 2009/0246435 A1 | 10/2009 | Shimono et al. |
| 2010/0063214 A1 | 3/2010 | Kasahara et al. |
| 2010/0212929 A1 | 8/2010 | Ishii et al. |
| 2010/0273047 A1 | 10/2010 | Kunoike et al. |
| 2010/0314153 A1 | 12/2010 | Ishii et al. |
| 2010/0314154 A1 | 12/2010 | Kitahara et al. |
| 2011/0052970 A1 | 3/2011 | Kurata et al. |
| 2011/0052977 A1 | 3/2011 | Kurata et al. |
| 2011/0104562 A1 | 5/2011 | Byun et al. |
| 2011/0203830 A1 | 8/2011 | Kono et al. |
| 2011/0272173 A1 | 11/2011 | Shiotsuki et al. |
| 2012/0035329 A1 | 2/2012 | Isogai et al. |
| 2012/0094169 A1 | 4/2012 | Kim et al. |
| 2013/0130100 A1 | 5/2013 | Kurata et al. |
| 2014/0227533 A1 | 8/2014 | Murakami et al. |
| 2014/0287177 A1 | 9/2014 | Suda et al. |
| 2014/0378616 A1 | 12/2014 | Nakano et al. |
| 2015/0041145 A1 | 2/2015 | Colaianna et al. |
| 2015/0148481 A1 | 5/2015 | Brothers et al. |
| 2015/0158988 A1 | 6/2015 | Sawaki et al. |
| 2016/0006004 A1 | 1/2016 | Ogawa et al. |
| 2016/0108159 A1 | 4/2016 | Sekiguchi et al. |
| 2016/0272805 A1 | 9/2016 | Nakanishi et al. |
| 2016/0319089 A1 | 11/2016 | Imamura et al. |
| 2017/0008986 A1 | 1/2017 | Isaka et al. |
| 2017/0025204 A1 | 1/2017 | Chapman et al. |
| 2017/0214037 A1 | 7/2017 | Uematsu et al. |
| 2017/0260344 A1 | 9/2017 | Imamura et al. |
| 2018/0009204 A1 | 1/2018 | Higuchi et al. |
| 2018/0036931 A1 | 2/2018 | Higuchi et al. |
| 2018/0237566 A1 | 8/2018 | Aida et al. |
| 2018/0265654 A1 | 9/2018 | Imamura et al. |
| 2018/0283590 A1 | 10/2018 | Yokoyama et al. |
| 2019/0134939 A1 | 5/2019 | Colaianna et al. |
| 2019/0143628 A1 | 5/2019 | Colaianna et al. |
| 2019/0177453 A1 | 6/2019 | Isaka et al. |
| 2019/0193315 A1 | 6/2019 | Miyamoto et al. |
| 2019/0375929 A1 | 12/2019 | Nishimura et al. |
| 2020/0332037 A1 | 10/2020 | Isaka et al. |
| 2021/0008827 A1 | 1/2021 | Colaianna et al. |
| 2021/0008828 A1 | 1/2021 | Colaianna et al. |
| 2021/0024769 A1 | 1/2021 | Imamura et al. |
| 2021/0189031 A1 | 6/2021 | Hintzer et al. |
| 2021/0269568 A1 | 9/2021 | Imamura et al. |
| 2022/0001657 A1 | 1/2022 | Kikuchi et al. |
| 2022/0033636 A1 | 2/2022 | Nishimura et al. |
| 2022/0170573 A1 | 6/2022 | Imamura et al. |
| 2022/0181689 A1 | 6/2022 | Isaka et al. |
| 2022/0181698 A1 | 6/2022 | Isaka et al. |
| 2022/0181729 A1 | 6/2022 | Isaka et al. |
| 2022/0195088 A1 | 6/2022 | Imamura et al. |
| 2022/0213996 A1 | 7/2022 | Imamura et al. |
| 2022/0266485 A1 | 8/2022 | Tsuda et al. |
| 2022/0278403 A1 | 9/2022 | Isaka et al. |
| 2023/0227594 A1 | 7/2023 | Yamamoto et al. |
| 2023/0235107 A1 | 7/2023 | Isaka et al. |
| 2023/0235159 A1 | 7/2023 | Isaka et al. |
| 2023/0235160 A1 | 7/2023 | Isaka et al. |
| 2023/0238627 A1 | 7/2023 | Isaka et al. |
| 2023/0238628 A1 | 7/2023 | Zenke et al. |
| 2023/0238629 A1 | 7/2023 | Isaka et al. |
| 2023/0272136 A1 | 8/2023 | Zenke et al. |
| 2023/0295356 A1 | 9/2023 | Isaka et al. |
| 2023/0383031 A1 | 11/2023 | Isaka et al. |
| 2023/0383032 A1 | 11/2023 | Isaka et al. |
| 2023/0383033 A1 | 11/2023 | Zenke et al. |
| 2023/0383034 A1 | 11/2023 | Isaka et al. |
| 2023/0390977 A1 | 12/2023 | Hamada et al. |
| 2023/0390978 A1 | 12/2023 | Tsuda et al. |
| 2023/0390979 A1 | 12/2023 | Tsuda et al. |
| 2023/0390980 A1 | 12/2023 | Tsuda et al. |
| 2023/0390981 A1 | 12/2023 | Tsuda et al. |
| 2023/0391909 A1 | 12/2023 | Isaka et al. |
| 2023/0391910 A1 | 12/2023 | Isaka et al. |
| 2023/0391911 A1 | 12/2023 | Isaka et al. |
| 2023/0391912 A1 | 12/2023 | Isaka et al. |
| 2023/0391917 A1 | 12/2023 | Isaka et al. |
| 2023/0391920 A1 | 12/2023 | Isaka et al. |
| 2023/0391927 A1 | 12/2023 | Isaka |
| 2023/0391929 A1 | 12/2023 | Isaka et al. |
| 2023/0391931 A1 | 12/2023 | Isaka et al. |
| 2023/0391932 A1 | 12/2023 | Isaka et al. |
| 2023/0391933 A1 | 12/2023 | Isaka et al. |
| 2023/0392737 A1 | 12/2023 | Tsuda et al. |
| 2023/0395282 A1 | 12/2023 | Isaka et al. |
| 2023/0399431 A1 | 12/2023 | Isaka et al. |
| 2023/0399432 A1 | 12/2023 | Isaka et al. |
| 2023/0399438 A1 | 12/2023 | Isaka et al. |
| 2023/0399441 A1 | 12/2023 | Isaka et al. |
| 2023/0399443 A1 | 12/2023 | Isaka et al. |
| 2023/0406975 A1 | 12/2023 | Isaka et al. |
| 2023/0406976 A1 | 12/2023 | Isaka et al. |
| 2023/0411751 A1 | 12/2023 | Tsuda et al. |
| 2023/0415387 A1 | 12/2023 | Hamada et al. |
| 2025/0002728 A1 | 1/2025 | Zenke et al. |
| 2025/0011488 A1 | 1/2025 | Isaka et al. |
| 2025/0011490 A1 | 1/2025 | Isaka et al. |
| 2025/0011494 A1 | 1/2025 | Isaka et al. |
| 2025/0011496 A1 | 1/2025 | Yamamoto et al. |
| 2025/0011498 A1 | 1/2025 | Isaka et al. |
| 2025/0011499 A1 | 1/2025 | Isaka et al. |
| 2025/0011500 A1 | 1/2025 | Isaka et al. |
| 2025/0019476 A1 | 1/2025 | Isaka et al. |
| 2025/0034302 A1 | 1/2025 | Isaka et al. |

FOREIGN PATENT DOCUMENTS

| | | |
|---|---|---|
| CN | 107428144 A | 12/2017 |
| CN | 109476061 | 3/2019 |
| CN | 110712348 A | 1/2020 |

(56) References Cited

FOREIGN PATENT DOCUMENTS

| | | |
|---|---|---|
| CN | 110790854 A | 2/2020 |
| CN | 114223086 A | 3/2022 |
| CN | 114258609 A | 3/2022 |
| CN | 116390957 A | 7/2023 |
| CN | 116867821 A | 10/2023 |
| CN | 116917346 A | 10/2023 |
| EP | 0 220 910 A2 | 5/1987 |
| EP | 0 423 995 A1 | 4/1991 |
| EP | 0 976 544 A1 | 2/2000 |
| EP | 1 462 458 A1 | 9/2004 |
| EP | 4 024 550 A1 | 7/2022 |
| EP | 4 024 575 A1 | 7/2022 |
| EP | 4 223 793 A1 | 8/2023 |
| EP | 4 223 794 A1 | 8/2023 |
| GB | 1210794 A | 10/1970 |
| JP | 48-20788 B1 | 6/1973 |
| JP | 58-132512 A | 8/1983 |
| JP | 58-191127 A | 11/1983 |
| JP | 59-120433 A | 7/1984 |
| JP | 62-104822 A | 5/1987 |
| JP | 62-53019 B2 | 11/1987 |
| JP | 1-53167 B2 | 11/1989 |
| JP | 2-129253 A | 5/1990 |
| JP | 3-184209 A | 8/1991 |
| JP | 3-247609 A | 11/1991 |
| JP | 4-357398 A | 12/1992 |
| JP | 6-1902 A | 1/1994 |
| JP | 6-40813 B2 | 6/1994 |
| JP | 6-287405 A | 10/1994 |
| JP | 7-16869 A | 1/1995 |
| JP | 7-112449 A | 5/1995 |
| JP | 7-188337 A | 7/1995 |
| JP | 7-290496 A | 11/1995 |
| JP | 8-207106 A | 8/1996 |
| JP | 8-321287 A | 12/1996 |
| JP | 9-245832 A | 9/1997 |
| JP | 10-87746 A | 4/1998 |
| JP | 10-275604 A | 10/1998 |
| JP | 10-292054 A | 11/1998 |
| JP | 2001-151825 A | 6/2001 |
| JP | 2001-151826 A | 6/2001 |
| JP | 2001-283907 A | 10/2001 |
| JP | 2001-283921 A | 10/2001 |
| JP | 2002-53620 A | 2/2002 |
| JP | 2002-63934 A | 2/2002 |
| JP | 2002-167488 A | 6/2002 |
| JP | 2003-327770 A | 11/2003 |
| JP | 2003-534940 A | 11/2003 |
| JP | 2004-256406 A | 9/2004 |
| JP | 2004-534131 A | 11/2004 |
| JP | 2005-523979 A | 8/2005 |
| JP | 2005-298659 A | 10/2005 |
| JP | 2005-320497 A | 11/2005 |
| JP | 2006-117912 A | 5/2006 |
| JP | 2006-312736 A | 11/2006 |
| JP | 2007-238960 A | 9/2007 |
| JP | 2008-66254 A | 3/2008 |
| JP | 2009-42478 A | 2/2009 |
| JP | 2009-59690 A | 3/2009 |
| JP | 2009-235564 A | 10/2009 |
| JP | 2009-272207 A | 11/2009 |
| JP | 2010-56079 A | 3/2010 |
| JP | 2010-509443 A | 3/2010 |
| JP | 2010-85741 A | 4/2010 |
| JP | 2010-162817 A | 7/2010 |
| JP | 2010-235667 A | 10/2010 |
| JP | 2011-48976 A | 3/2011 |
| JP | 2011-71104 A | 4/2011 |
| JP | 2012-54269 A | 3/2012 |
| JP | 2012-80911 A | 4/2012 |
| JP | 2012-106494 A | 6/2012 |
| JP | 2012-130557 A | 7/2012 |
| JP | 2013-71341 A | 4/2013 |
| JP | 2013-82888 A | 5/2013 |
| JP | 2013-177574 A | 9/2013 |
| JP | 2014-28951 A | 2/2014 |
| JP | 2014-59052 A | 4/2014 |
| JP | 2014-187040 A | 10/2014 |
| JP | 2015-7218 A | 1/2015 |
| JP | 2015-519410 A | 7/2015 |
| JP | 2015-147924 A | 8/2015 |
| JP | 2015-168840 A | 9/2015 |
| JP | 2016-537499 A | 12/2016 |
| JP | 2017-197690 A | 11/2017 |
| JP | 2018-20468 A | 2/2018 |
| JP | 2018-514598 A | 6/2018 |
| JP | 2018-523272 A | 8/2018 |
| JP | 2018-159090 A | 10/2018 |
| JP | 2019-172962 A | 10/2019 |
| JP | 2019-210420 A | 12/2019 |
| JP | 2019-214641 A | 12/2019 |
| JP | 2020-2341 A | 1/2020 |
| JP | 2020-15906 A | 1/2020 |
| JP | 2020-29042 A | 2/2020 |
| JP | 2020-100823 A | 7/2020 |
| JP | 2020-100843 A | 7/2020 |
| JP | 2021-6648 A | 1/2021 |
| JP | 2021-141043 A | 9/2021 |
| JP | 2021-141045 A | 9/2021 |
| JP | 2022-19196 A | 1/2022 |
| KR | 10-2004-0071160 A | 8/2004 |
| KR | 10-2019-0034205 A | 4/2019 |
| WO | 95/29956 A1 | 11/1995 |
| WO | 01/40331 A1 | 6/2001 |
| WO | 03/006566 A1 | 1/2003 |
| WO | 03/048214 A1 | 6/2003 |
| WO | 2004/052987 A1 | 6/2004 |
| WO | 2008/032613 A1 | 3/2008 |
| WO | 2008/047759 A1 | 4/2008 |
| WO | 2008/047906 A1 | 4/2008 |
| WO | 2008/143069 A1 | 11/2008 |
| WO | 2010/113864 A1 | 10/2010 |
| WO | 2013/115374 A1 | 8/2013 |
| WO | 2014/007346 A1 | 1/2014 |
| WO | 2014/129413 A1 | 8/2014 |
| WO | 2015/119053 A1 | 8/2015 |
| WO | 2016/117492 A1 | 7/2016 |
| WO | 2017/056203 A1 | 4/2017 |
| WO | 2017/082417 A1 | 5/2017 |
| WO | 2019/003265 A1 | 1/2019 |
| WO | 2020/004083 A1 | 1/2020 |
| WO | 2020/090981 A1 | 5/2020 |
| WO | 2020/204163 A1 | 10/2020 |
| WO | 2021/033539 A1 | 2/2021 |
| WO | 2021/039862 A1 | 3/2021 |
| WO | 2021/039863 A1 | 3/2021 |
| WO | 2021/039865 A1 | 3/2021 |
| WO | 2021039864 A1 | 3/2021 |
| WO | 2021/059753 A1 | 4/2021 |
| WO | 2022/181225 A1 | 1/2022 |

OTHER PUBLICATIONS

European Search Report issued Dec. 5, 2024 for European Patent Application No. 22759265.6.
European Search Report issued Dec. 10, 2024 for European Patent Application No. 22759267.2.
European Search Report issued Dec. 13, 2024 for European Patent Application No. 22 759 272.2.
European Search Report issued Dec. 16, 2024 for European Patent Application No. 22759276.3.
European Search Report issued Dec. 13, 2024 for European Patent Application No. 22759273.0.
European Search Report issued Dec. 19, 2024 for European Patent Application No. 22759264.9.
European Search Report issued Dec. 19, 2024 for European Patent Application No. 22759277.1.
European Search Report issued Jan. 2, 2025 for European Patent Application No. 22759281.3.
European Search Report issued Jan. 3, 2025 for European Patent Application No. 22759261.5.
European Search Report issued Jan. 3, 2025 for European Patent Application No. 22759274.8.

(56) References Cited

OTHER PUBLICATIONS

European Search Report issued Jan. 16, 2025 for European Patent Application No. 22759269.8.
European Search Report issued Jan. 14, 2025 for European Patent Application No. 22759282.1.
European Search Report issued Jan. 14, 2025 for European Patent Application No. 22759262.3.
European Search Report issued Jan. 16, 2025 for European Patent Application No. 22759284.7.
European Search Report issued Jan. 27, 2025 for European Patent Application No. 22759268.0.
European Search Report issued Jan. 27, 2025 for European Patent Application No. 22759285.4.
European Search Report issued Feb. 4, 2025 for European Patent Application No. 22759266.4.
Paolo Corbelli, "ASTM D638: tensile test for plastics", Jul. 30, 2024, XP093227725, Retrieved from the Internet: URL:https://www.cermacsrl.com/en/astm-d638-tensile-test-for-plastics/, pp. 1-9 (9 total pages).
Keun Park et al., "Eliminating weldlines of an injection-molded part with the aid of high-frequency induction heating", Journal of Mechanical Science and Technology, vol. 24, No. 1, XP055158055, 2010, pp. 149-152 (4 total pages).
Nanyang Zhao et al., "In situ flow state characterization of molten resin at the inner mold in injection molding", Journal of Applied Polymer Science, John Wiley & Sons, Inc, US, vol. 141, No. 9, XP072571824, 2023, pp. 1-16 (16 total pages).
U.S. Appl. No. 17/679,789, filed Feb. 24, 2022, Isaka, et al., cont of PCT/JP2020/032238.
U.S. Appl. No. 17/679,831, filed Feb. 24, 2022, Isaka, et al., cont of PCT/JP2020/032239.
U.S. Appl. No. 17/679,818, filed Feb. 24, 2022, Isaka, et al., cont of PCT/JP2020/032236.
U.S. Appl. No. 17/679,765, filed Feb. 24, 2022, Isaka, et al., cont of PCT/JP2020/032237.
U.S. Appl. No. 17/680,911, filed Feb. 25, 2022, Tsuda, et al., cont of PCT/JP2020/032234.
U.S. Appl. No. 18/191,412, filed Mar. 28, 2023, Isaka, et al., cont of PCT/JP2021/036301.
U.S. Appl. No. 18/191,461, filed Mar. 28, 2023, Zenke, et al., cont of PCT/JP2021/036302.
U.S. Appl. No. 18/192,020, filed Mar. 29, 2023, Isaka, et al., cont of PCT/JP2021/036303.
U.S. Appl. No. 18/192,053, filed Mar. 29, 2023, Isaka, et al., cont of PCT/JP2021/036304.
Appln No. 18/192,101 filed Mar. 29, 2023, Yamamoto, et al., cont of PCT/JP2021/036305.
U.S. Appl. No. 18/191,996, filed Mar. 29, 2023, Tsuda, et al., cont of PCT/JP2021/036306.
U.S. Appl. No. 18/192,052, filed Mar. 29, 2023, Zenke, et al., cont of PCT/JP2021/036307.
U.S. Appl. No. 18/192,011, filed Mar. 29, 2023, Isaka, et al., cont of PCT/JP2021/036308.
U.S. Appl. No. 18/192,077, filed Mar. 29, 2023, Isaka, et al., cont of PCT/JP2021/036309.
U.S. Appl. No. 18/192,298, filed Mar. 29, 2023, Isaka, et al., cont of PCT/JP2021/036310.
U.S. Appl. No. 18/453,775, filed Aug. 22, 2023, Tsuda, et al., cont of PCT/JP2022/007735.
U.S. Appl. No. 18/453,690, filed Aug. 22, 2023, Tsuda, et al., cont of PCT/JP2022/007737.
U.S. Appl. No. 18/452,806, filed Aug. 21, 2023, Tsuda, et al., cont of PCT/JP2022/007738.
U.S. Appl. No. 18/450,642, filed Aug. 16, 2023, Isaka, et al., cont of PCT/JP2022/003634.
U.S. Appl. No. 18/448,291, filed Aug. 11, 2023, Isaka, et al., cont of PCT/JP2022/003635.
U.S. Appl. No. 18/449,061, filed Aug. 14, 2023, Isaka, et al., cont of PCT/JP2022/003636.
U.S. Appl. No. 18/448,234, filed Aug. 11, 2023, Isaka, et al., cont of PCT/JP2022/003637.
U.S. Appl. No. 18/453,363, filed Aug. 22, 2023, Isaka, et al., cont of PCT/JP2022/003638.
U.S. Appl. No. 18/449,788, filed Aug. 15, 2023, Isaka, et al., cont of PCT/JP2022/003640.
U.S. Appl. No. 18/451,502, filed Aug. 17, 2023, Isaka, et al., cont of PCT/JP2022/003641.
U.S. Appl. No. 18/450,590, filed Aug. 16, 2023, Tsuda, et al., cont of PCT/JP2022/003642.
U.S. Appl. No. 18/450,094, filed Aug. 15, 2023, Hamada, et al., cont of PCT/JP2022/003643.
U.S. Appl. No. 18/449,845, filed Aug. 15, 2023, Zenke, et al., cont of PCT/JP2022/003644.
U.S. Appl. No. 18/446,746, filed Aug. 9, 2023, Isaka, et al., cont of PCT/JP2022/003645.
U.S. Appl. No. 18/450,491, filed Aug. 16, 2023, Isaka, et al., cont of PCT/JP2022/003646.
U.S. Appl. No. 18/451,525, filed Aug. 17, 2023, Isaka, et al., cont of PCT/JP2022/003647.
U.S. Appl. No. 18/451,455, filed Aug. 17, 2023, Isaka, et al., cont of PCT/JP2022/003468.
U.S. Appl. No. 18/452,107, filed Aug. 18, 2023, Isaka, et al., cont of PCT/JP2022/003649.
U.S. Appl. No. 18/452,146, filed Aug. 18, 2023, Isaka, et al., cont of PCT/JP2022/003650.
U.S. Appl. No. 18/448,341, filed Aug. 11, 2023, Isaka, et al., cont of PCT/JP2022/003651.
U.S. Appl. No. 18/449,778, filed Aug. 15, 2023, Isaka, et al., cont of PCT/JP2022/003652.
U.S. Appl. No. 18/447,877, filed Aug. 10, 2023, Isaka, et al., cont of PCT/JP2022/003653.
U.S. Appl. No. 18/452,908, filed Aug. 21, 2023, Isaka, et al., cont of PCT/JP2022/003654.
U.S. Appl. No. 18/454,141, filed Aug. 23, 2023, Isaka, et al., cont of PCT/JP2022/003657.
U.S. Appl. No. 18/453,709, filed Aug. 22, 2023, Isaka, et al., cont of PCT/JP2022/003658.
U.S. Appl. No. 18/452,769, filed Aug. 21, 2023, Isaka, et al., cont of PCT/JP2022/003659.
U.S. Appl. No. 18/453,810, filed Aug. 22, 2023, Tsuda, et al., cont of PCT/JP2022/003660.
U.S. Appl. No. 18/450,568, filed Aug. 16, 2023, Hamada, et al., cont of PCT/JP2022/003661.
U.S. Appl. No. 18/453,683, filed Aug. 22, 2023, Isaka, et al., cont of PCT/JP2022/003664.
U.S. Appl. No. 18/454,133, filed Aug. 23, 2023, Isaka, et al., cont of PCT/JP2022/003665.
Translation of the International Search Report issued Oct. 13, 2020 in International Application No. PCT/JP2020/032236.
Translation of the International Search Report issued Oct. 13, 2020 in International Application No. PCT/JP2020/032237.
Translation of the International Search Report issued Oct. 13, 2020 in International Application No. PCT/JP2020/032238.
Translation of the International Search Report issued Oct. 13, 2020 in International Application No. PCT/JP2020/032239.
Translation of the International Search Report issued Oct. 6, 2020 in International Application No. PCT/JP2020/032234.
International Preliminary Report on Patentability, with Translation of Written Opinion issued Mar. 1, 2022 in International Application No. PCT/JP2020/032238.
International Preliminary Report on Patentability, with Translation of Written Opinion issued Mar. 1, 2022 in International Application No. PCT/JP2020/032239.
International Preliminary Report on Patentability, with Translation of Written Opinion issued Mar. 1, 2022 in International Application No. PCT/JP2020/032236.
International Preliminary Report on Patentability, with Translation of Written Opinion issued Mar. 1, 2022 in International Application No. PCT/JP2020/032237.
International Preliminary Report on Patentability, with Translation of Written Opinion issued Mar. 1, 2022 in International Application No. PCT/JP2020/032234.

(56) References Cited

OTHER PUBLICATIONS

Translation of the International Search Report dated Dec. 21, 2021 in International Application No. PCT/JP2021/036301.
Translation of the International Search Report dated Dec. 21, 2021 in International Application No. PCT/JP2021/036302.
Translation of the International Search Report dated Dec. 21, 2021 in International Application No. PCT/JP2021/036303.
Translation of the International Search Report dated Nov. 9, 2021 in International Application No. PCT/JP2021/036304.
Translation of the International Search Report dated Apr. 12, 2022 in International Application No. PCT/JP2022/003643.
Translation of the International Search Report dated Nov. 1, 2021 in International Application No. PCT/JP2021/036305.
Translation of the International Search Report dated Nov. 22, 2021 in International Application No. PCT/JP2021/036306.
Translation of the International Search Report dated Nov. 22, 2021 in International Application No. PCT/JP2021/036307.
Translation of the International Search Report dated Nov. 22, 2021 in International Application No. PCT/JP2021/036308.
Translation of the International Search Report dated Nov. 22, 2021 in International Application No. PCT/JP2021/036309.
Translation of the International Search Report dated Nov. 22, 2021 in International Application No. PCT/JP2021/036310.
Translation of the International Search Report dated Apr. 19, 2022 in International Application No. PCT/JP2022/003634.
Translation of the International Search Report dated Apr. 19, 2022 in International Application No. PCT/JP2022/003636.
Translation of the International Search Report dated Apr. 5, 2022 in International Application No. PCT/JP2022/003637.
Translation of the International Search Report dated Apr. 5, 2022 in International Application No. PCT/JP2022/003638.
Translation of the International Search Report dated Apr. 5, 2022 in International Application No. PCT/JP2022/003640.
Translation of the International Search Report dated Apr. 5, 2022 in International Application No. PCT/JP2022/003641.
Translation of the International Search Report dated Apr. 12, 2022 in International Application No. PCT/JP2022/003642.
Translation of the International Search Report dated Apr. 19, 2022 in International Application No. PCT/JP2022/003644.
Translation of the International Search Report dated Apr. 19, 2022 in International Application No. PCT/JP2022/003645.
Translation of the International Search Report dated Apr. 12, 2022 in International Application No. PCT/JP2022/003646.
Translation of the International Search Report dated Apr. 12, 2022 in International Application No. PCT/JP2022/003647.
Translation of the International Search Report dated Mar. 8, 2022 in International Application No. PCT/JP2022/003648.
Translation of the International Search Report dated Apr. 19, 2022 in International Application No. PCT/JP2022/003649.
Translation of the International Search Report dated Apr. 19, 2022 in International Application No. PCT/JP2022/003650.
Translation of the International Search Report dated Apr. 19, 2022 in International Application No. PCT/JP2022/003651.
Translation of the International Search Report dated Mar. 22, 2022 in International Application No. PCT/JP2022/003652.
Translation of the International Search Report dated Apr. 19, 2022 in International Application No. PCT/JP2022/003653.
Translation of the International Search Report dated Apr. 19, 2022 in International Application No. PCT/JP2022/003654.
Translation of the International Search Report dated Mar. 22, 2022 in International Application No. PCT/JP2022/003657.
Translation of the International Search Report dated Mar. 22, 2022 in International Application No. PCT/JP2022/003658.
Translation of the International Search Report dated Apr. 19, 2022 in International Application No. PCT/JP2022/003659.
Translation of the International Search Report dated Mar. 8, 2022 in International Application No. PCT/JP2022/003660.
Translation of the International Search Report dated Mar. 15, 2022 in International Application No. PCT/JP2022/003661.
Translation of the International Search Report dated Apr. 19, 2022 in International Application No. PCT/JP2022/003664.
Translation of the International Search Report dated Apr. 19, 2022 in International Application No. PCT/JP2022/003665.
Translation of the International Search Report dated May 24, 2022 in International Application No. PCT/JP2022/007735.
Translation of the International Search Report dated May 17, 2022 in International Application No. PCT/JP2022/007737.
Translation of the International Search Report dated May 10, 2022 in International Application No. PCT/JP2022/007738.
Translation of the International Search Report dated Apr. 19, 2022 in International Application No. PCT/JP2022/003635.
International Preliminary Report on Patentability, with Translation of Written Opinion issued Mar. 28, 2023 in International Application No. PCT/JP2021/036301.
International Preliminary Report on Patentability, with Translation of Written Opinion issued Mar. 28, 2023 in International Application No. PCT/JP2021/036302.
International Preliminary Report on Patentability, with Translation of Written Opinion issued Mar. 28, 2023 in International Application No. PCT/JP2021/036303.
International Preliminary Report on Patentability, with Translation of Written Opinion issued Mar. 28, 2023 in International Application No. PCT/JP2021/036304.
International Preliminary Report on Patentability, with Translation of Written Opinion issued Mar. 28, 2023 in International Application No. PCT/JP2021/036305.
International Preliminary Report on Patentability, with Translation of Written Opinion issued Mar. 28, 2023 in International Application No. PCT/JP2021/036306.
International Preliminary Report on Patentability, with Translation of Written Opinion issued Mar. 28, 2023 in International Application No. PCT/JP2021/036307.
International Preliminary Report on Patentability, with Translation of Written Opinion issued Mar. 28, 2023 in International Application No. PCT/JP2021/036308.
International Preliminary Report on Patentability, with Translation of Written Opinion issued Mar. 28, 2023 in International Application No. PCT/JP2021/036309.
International Preliminary Report on Patentability, with Translation of Written Opinion issued Mar. 28, 2023 in International Application No. PCT/JP2021/036310.
European Search Report issued Aug. 2, 2023 for European Patent Application No. 20 857 704.9.
International Preliminary Report on Patentability, with Translation of Written Opinion issued Aug. 29, 2023 in International Application No. PCT/JP2022/003634.
International Preliminary Report on Patentability, with Translation of Written Opinion issued Aug. 29, 2023 in International Application No. PCT/JP2022/003635.
International Preliminary Report on Patentability, with Translation of Written Opinion issued Aug. 29, 2023 in International Application No. PCT/JP2022/003636.
International Preliminary Report on Patentability, with Translation of Written Opinion issued Aug. 29, 2023 in International Application No. PCT/JP2022/003637.
International Preliminary Report on Patentability, with Translation of Written Opinion issued Aug. 29, 2023 in International Application No. PCT/JP2022/003638.
International Preliminary Report on Patentability, with Translation of Written Opinion issued Aug. 29, 2023 in International Application No. PCT/JP2022/003640.
International Preliminary Report on Patentability, with Translation of Written Opinion issued Aug. 29, 2023 in International Application No. PCT/JP2022/003641.
International Preliminary Report on Patentability, with Translation of Written Opinion issued Aug. 29, 2023 in International Application No. PCT/JP2022/003642.
International Preliminary Report on Patentability, with Translation of Written Opinion issued Aug. 29, 2023 in International Application No. PCT/JP2022/003643.

(56) References Cited

OTHER PUBLICATIONS

International Preliminary Report on Patentability, with Translation of Written Opinion issued Aug. 29, 2023 in International Application No. PCT/JP2022/003644.
International Preliminary Report on Patentability, with Translation of Written Opinion issued Aug. 29, 2023 in International Application No. PCT/JP2022/003645.
International Preliminary Report on Patentability, with Translation of Written Opinion issued Aug. 29, 2023 in International Application No. PCT/JP2022/003646.
International Preliminary Report on Patentability, with Translation of Written Opinion issued Aug. 29, 2023 in International Application No. PCT/JP2022/003647.
International Preliminary Report on Patentability, with Translation of Written Opinion issued Aug. 29, 2023 in International Application No. PCT/JP2022/003648.
International Preliminary Report on Patentability, with Translation of Written Opinion issued Aug. 29, 2023 in International Application No. PCT/JP2022/003649.
International Preliminary Report on Patentability, with Translation of Written Opinion issued Aug. 29, 2023 in International Application No. PCT/JP2022/003650.
International Preliminary Report on Patentability, with Translation of Written Opinion issued Aug. 29, 2023 in International Application No. PCT/JP2022/003651.
International Preliminary Report on Patentability, with Translation of Written Opinion issued Aug. 29, 2023 in International Application No. PCT/JP2022/003652.
International Preliminary Report on Patentability, with Translation of Written Opinion issued Aug. 29, 2023 in International Application No. PCT/JP2022/003653.
International Preliminary Report on Patentability, with Translation of Written Opinion issued Aug. 29, 2023 in International Application No. PCT/JP2022/003654.
International Preliminary Report on Patentability, with Translation of Written Opinion issued Aug. 29, 2023 in International Application No. PCT/JP2022/003657.
International Preliminary Report on Patentability, with Translation of Written Opinion issued Aug. 29, 2023 in International Application No. PCT/JP2022/003658.
International Preliminary Report on Patentability, with Translation of Written Opinion issued Aug. 29, 2023 in International Application No. PCT/JP2022/003659.
International Preliminary Report on Patentability, with Translation of Written Opinion issued Aug. 29, 2023 in International Application No. PCT/JP2022/003660.
International Preliminary Report on Patentability, with Translation of Written Opinion issued Aug. 29, 2023 in International Application No. PCT/JP2022/003661.
International Preliminary Report on Patentability, with Translation of Written Opinion issued Aug. 29, 2023 in International Application No. PCT/JP2022/003664.
International Preliminary Report on Patentability, with Translation of Written Opinion issued Aug. 29, 2023 in International Application No. PCT/JP2022/003665.
International Preliminary Report on Patentability, with Translation of Written Opinion issued Aug. 29, 2023 in International Application No. PCT/JP2022/007735.
International Preliminary Report on Patentability, with Translation of Written Opinion issued Aug. 29, 2023 in International Application No. PCT/JP2022/007737.
International Preliminary Report on Patentability, with Translation of Written Opinion issued Aug. 29, 2023 in International Application No. PCT/JP2022/007738.
Translation of the International Search Report dated Jun. 20, 2023 in International Application No. PCT/JP2023/013284.
Translation of the International Search Report dated Jun. 6, 2023 in International Application No. PCT/JP2023/013285.
Translation of the International Search Report dated Jun. 6, 2023 in International Application No. PCT/JP2023/013289.
Translation of the International Search Report dated Jun. 6, 2023 in International Application No. PCT/JP2023/013291.
Translation of the International Search Report dated Jun. 6, 2023 in International Application No. PCT/JP2023/013292.
Translation of the International Search Report dated Jun. 6, 2023 in International Application No. PCT/JP2023/013293.
Translation of the International Search Report dated Jun. 6, 2023 in International Application No. PCT/JP2023/013331.
Translation of the International Search Report dated Jun. 6, 2023 in International Application No. PCT/JP2023/013332.
Translation of the International Search Report dated Jun. 6, 2023 in International Application No. PCT/JP2023/013333.
Translation of the International Search Report dated Jun. 20, 2023 in International Application No. PCT/JP2023/013290.
European Search Report issued Oct. 20, 2023 for European Patent Application No. 20 856 953.3.
European Search Report issued Oct. 20, 2023 for European Patent Application No. 20 857 574.6.
European Search Report issued Oct. 20, 2023 for European Patent Application No. 20 857 843.5.
European Search Report issued Oct. 20, 2023 for European Patent Application No. 20 857 470.7.
International Search Report dated Jun. 20, 2023 in International Application No. PCT/JP2023/013284.
International Search Report dated Jun. 6, 2023 in International Application No. PCT/JP2023/013285.
International Search Report dated Jun. 6, 2023 for International Application No. PCT/JP2023/013289.
International Search Report dated Jun. 20, 2023 for International Application No. PCT/JP2023/013290.
International Search Report dated Jun. 6, 2023 for International Application No. PCT/JP2023/013291.
International Search Report dated Jun. 6, 2023 for International Application No. PCT/JP2023/013292.
International Search Report dated Jun. 6, 2023 for International Application No. PCT/JP2023/013293.
International Search Report dated Jun. 6, 2023 for International Application No. PCT/JP2023/013331.
International Search Report dated Jun. 6, 2023 for International Application No. PCT/JP2023/013332.
International Search Report dated Jun. 6, 2023 for International Application No. PCT/JP2023/013333.
International Preliminary Report on Patentability, with Translation of Written Opinion issued Sep. 24, 2024 in International Application No. PCT/JP2023/013284.
International Preliminary Report on Patentability, with Translation of Written Opinion issued Sep. 24, 2024 in International Application No. PCT/JP2023/013285.
International Preliminary Report on Patentability, with Translation of Written Opinion issued Sep. 24, 2024 in International Application No. PCT/JP2023/013289.
International Preliminary Report on Patentability, with Translation of Written Opinion issued Sep. 24, 2024 in International Application No. PCT/JP2023/013290.
International Preliminary Report on Patentability, with Translation of Written Opinion issued Sep. 24, 2024 in International Application No. PCT/JP2023/013291.
International Preliminary Report on Patentability, with Translation of Written Opinion issued Sep. 24, 2024 in International Application No. PCT/JP2023/013292.
International Preliminary Report on Patentability, with Translation of Written Opinion issued Sep. 24, 2024 in International Application No. PCT/JP2023/013293.
International Preliminary Report on Patentability, with Translation of Written Opinion issued Sep. 24, 2024 in International Application No. PCT/JP2023/013331.
International Preliminary Report on Patentability, with Translation of Written Opinion issued Sep. 24, 2024 in International Application No. PCT/JP2023/013332.
International Preliminary Report on Patentability, with Translation of Written Opinion issued Sep. 24, 2024 in International Application No. PCT/JP2023/013333.

(56) References Cited

OTHER PUBLICATIONS

European Search Report issued Aug. 27, 2024 for European Patent Application No. 21875831.6.
European Search Report issued Aug. 27, 2024 for European Patent Application No. 21875832.4.
European Search Report issued Aug. 29, 2024 for European Patent Application No. 21875833.2.
European Search Report issued Aug. 29, 2024 for European Patent Application No. 21875834.0.
European Search Report issued Sep. 9, 2024 for European Patent Application No. 21875826.6.
European Search Report issued Sep. 9, 2024 for European Patent Application No. 21875828.2.
European Search Report issued Sep. 9, 2024 for European Patent Application No. 21875829.0.
European Search Report issued Sep. 9, 2024 for European Patent Application No. 21875830.8.
European Search Report issued Sep. 10, 2024 for European Patent Application No. 21875835.7.
European Search Report issued Sep. 19, 2024 for European Patent Application No. 21875827.4.
European Search Report issued Feb. 10, 2025 for European Patent Application No. 22759283.9.
European Search Report issued Feb. 20, 2025 for European Patent Application No. 22759263.1.

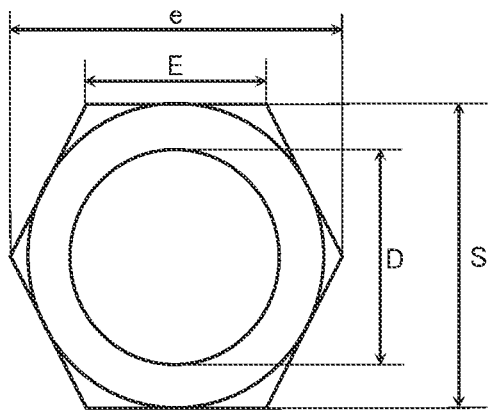
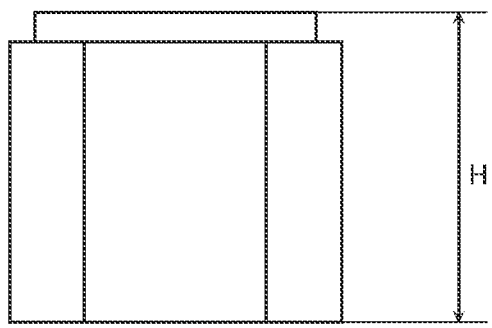
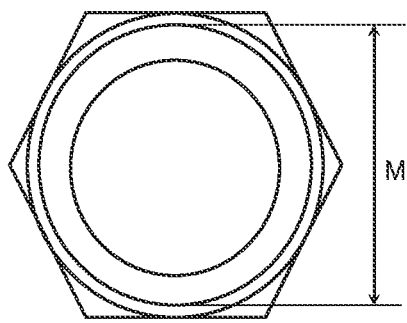

INJECTION-MOLDED BODY AND PRODUCTION METHOD THEREFOR

CROSS-REFERENCE TO RELATED APPLICATIONS

This application is a Rule 53(b) Continuation of International Application No. PCT/JP2022/003643 filed Jan. 31, 2022, which claims priorities based on Japanese Patent Application No. 2021-031094 filed Feb. 26, 2021 and Japanese Patent Application No. 2021-162125 filed Sep. 30, 2021, the respective disclosures of which are incorporated herein by reference in their entirety.

TECHNICAL FIELD

The present disclosure relates to an injection molded article and a method for producing the same.

BACKGROUND ART

Patent Document 1 describes an ozone-resistant injection molded article comprising a perfluororesin, wherein the perfluororesin is composed of a perfluoro polymer, has an MIT value of 300,000 cycles or more, and has not more than 50 unstable end groups per $1 \times 10^6$ carbon atoms in the perfluoro polymer.

RELATED ART

Patent Document

Patent Document 1: International Publication No. WO 2003/048214

SUMMARY

According to the present disclosure, there is provided an injection molded article comprising a copolymer comprising tetrafluoroethylene unit and a fluoro(alkyl vinyl ether) unit, wherein the content of the fluoro(alkyl vinyl ether) unit of the copolymer is 4.7 to 7.0% by mass with respect to the whole of the monomer units, the melt flow rate at 372° C. of the copolymer is 11.0 to 22.0 g/10 min, the melting point of the copolymer is 296 to 305° C., and the amount of fluorine ions dissolving out from the injection molded article into water is 7,500 µg/m$^2$ or lower.

Effect

According to the present disclosure, there is provided an injection molded article which is excellent in physical properties such as the water vapor low permeability, the chemical solution low permeability, the abrasion resistance, the mechanical property and the rigidity at high temperatures, and has a largely improved ozone resistance.

BRIEF DESCRIPTION OF DRAWING

The FIGURE is a top view, a front view, and a bottom view of the shape of nuts prepared in Experimental Examples and Comparative Examples.

DESCRIPTION OF EMBODIMENTS

Hereinafter, specific embodiments of the present disclosure will be described in detail, but the present disclosure is not limited to the following embodiments.

Patent Document 1 proposes, in particular, as an article excellent in the ozone resistance such as a piping member or a joint used in a semiconductor production apparatus, an ozone-resistant injection molded article comprising a perfluororesin, wherein the perfluororesin consists of a perfluoro polymer, has an MIT value of 300,000 cycles or more, and has not more than 50 unstable end groups per $1 \times 10^6$ carbon atoms in the perfluoro polymer.

Further, it is described in Example 4 in Patent Document 1 that, when a cap nut is prepared by injection molding using a tetrafluoroethylene/perfluoro(propyl vinyl ether)copolymer having a melt flow rate (MFR) of 14.8 g/10 min and the cap nut is subjected to an ozone exposure test, more than 10 cracks are generated after 90 days. Such a cap nut has sufficient ozone resistance, but if an injection molded article having a further improved ozone resistance can be obtained, a longer service life of parts can be achieved, which can result in the reduction of cost.

The present inventors have made intensive studies to solve the problem and found that an injection molded article produced by using a copolymer having a relatively high MFR of about 14.8 g/10 min tends to be more inferior in the ozone resistance than an injection molded article produced by using a copolymer having a relatively low MFR. Then, in addition to the configuration of the copolymer used in injection molding, injection conditions have been largely reconsidered, and as a result, the present inventors have found that the ozone resistance of the injection molded article is largely improved when the amount of fluorine ions dissolving out from the injection molded article into water is low, even by using a copolymer having a relatively high MFR of about 14.8 g/10 min, thereby completing the injection molded article of the present disclosure.

That is, the injection molded article of the present disclosure is an injection molded article containing a specific copolymer, wherein the amount of fluorine ions dissolving out from the injection molded article into water is 7,500 µg/m$^2$ or lower. The injection molded article of the present disclosure, due to having such a configuration, is excellent in physical properties such as the water vapor low permeability, the chemical solution low permeability, the abrasion resistance, the mechanical property and the rigidity at high temperatures, and is also excellent in the ozone resistance. Therefore, for example, when the injection molded article of the present disclosure is utilized as a nut, there can be obtained a nut in which the screw thread is hardly chipped and which is hardly cracked even by being used in an environment in contact with ozone gas or ozone water, and hardly deforms and hardly loosens even by being used at high temperatures. Further, such a nut has a high tensile strength and is hardly broken.

The amount of fluorine ions dissolving out from the injection molded article into water is 7,500 µg/m$^2$ or lower, and since the ozone resistance of the injection molded article can further be improved, preferably 5,500 µg/m$^2$ or lower, still more preferably 5,000 µg/m$^2$ or lower, and especially preferably 4,500 µg/m$^2$ or lower. The lower limit of the amount of fluorine ions dissolving out is not limited, and for example, may be 100 µg/m$^2$ or higher, and 500 µg/m$^2$ or higher, but the lower, the more preferable.

The amount of fluorine ions dissolving out from the injection molded article into water can be specified by immersing the injection molded article in water at 121° C. for 1 hour, and thereafter, measuring the fluorine ion concentration of the recovered water using a fluorine ion meter, and calculating the amount of fluorine ions dissolving out per surface area of the injection molded article.

The present inventors have made intensive studies and found that, when the amount of fluorine ions dissolving out from the injection molded article is low and the amount of metal dissolving out from the injection molded article into 50% by mass hydrofluoric acid is low, the injection molded article exhibits a further improved ozone resistance.

Since the ozone resistance of the injection molded article can further be improved, the amount of metal dissolving out from the injection molded article into 50% by mass hydrofluoric acid is preferably 200 µg/m² or lower, more preferably 150 µg/m² or lower, still more preferably 100 µg/m² or lower, and especially preferably 50 µg/m² or lower. The lower limit of the amount of metal dissolving out is not limited, and for example, may be 0.1 µg/m² or higher, 0.5 µg/m² or higher, 1.0 µg/m² or higher, and 5 µg/m² or higher, but the lower, the more preferable.

In the present disclosure, the amount of metal dissolving out is the total amount of iron, chrome, and nickel dissolving out from the injection molded article into 50% by mass hydrofluoric acid. The amount of metal dissolving out from the injection molded article into 50% by mass hydrofluoric acid can be specified by immersing the injection molded article in 50% by mass hydrofluoric acid at 25° C. for 24 hours, then measuring the metal concentration in the solution for measurement prepared from the recovered 50% by mass hydrofluoric acid using an ICP emission analyzer, and calculating the amount of metal dissolving out per surface area of the injection molded article.

The injection molded article having an amount of fluorine ions dissolving out and an amount of metal dissolving out within the above ranges can be produced by carrying out the method for producing an injection molded article described below using a specific copolymer.

The injection molded article of the present disclosure contains a copolymer containing tetrafluoroethylene (TFE) unit and a fluoro(alkyl vinyl ether) (FAVE) unit. The copolymer is a melt-fabricable fluororesin. Being melt-fabricable means that a polymer can be melted and processed by using a conventional processing device such as an extruder or an injection molding machine.

Examples of the FAVE constituting the above FAVE unit include at least one selected from the group consisting of a monomer represented by the general formula (1):

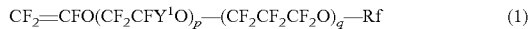

$$CF_2=CFO(CF_2CFY^1O)_p-(CF_2CF_2CF_2O)_q-Rf \quad (1)$$

wherein $Y^1$ represents F or $CF_3$, and Rf represents a perfluoroalkyl group having 1 to 5 carbon atoms; p represents an integer of 0 to 5; and q represents an integer of 0 to 5, and a monomer represented by the general formula (2):

$$CFX=CXOCF_2OR^1 \quad (2)$$

wherein X is the same or different and represents H, F or $CF_3$; $R^1$ represents a linear or branched fluoroalkyl group having 1 to 6 carbon atoms which may contain one or two atoms of at least one selected from the group consisting of H, Cl, Br and I, or a cyclic fluoroalkyl group having 5 or 6 carbon atoms which may contain one or two atoms of at least one selected from the group consisting of H, Cl, Br and I.

Among them, the above FAVE is preferably the monomer represented by the general formula (1), more preferably at least one selected from the group consisting of perfluoro (methyl vinyl ether), perfluoro(ethyl vinyl ether) (PEVE) and perfluoro(propyl vinyl ether) (PPVE), still more preferably at least one selected from the group consisting of PEVE and PPVE, and particularly preferably PPVE.

The content of the FAVE unit of the copolymer is 4.7 to 7.0% by mass with respect to the whole of the monomer units. The content of the FAVE unit of the copolymer is preferably 4.8% by mass or higher, more preferably 4.9% by mass or higher, still more preferably 5.0% by mass or higher, especially preferably 5.1% by mass or higher, and most preferably 5.2% by mass or higher, and preferably 6.9% by mass or lower, more preferably 6.8% by mass or lower, still more preferably 6.7% by mass or lower, especially preferably 6.6% by mass or lower, and most preferably 6.2% by mass or lower. Due to that the content of the FAVE unit is in the above range, the injection molded article is excellent in physical properties such as the water vapor low permeability, the abrasion resistance, the mechanical property and the rigidity at high temperatures. When the content of the FAVE unit of the copolymer is too low, the ozone resistance, the abrasion resistance and the mechanical property of the injection molded article deteriorate. When the content of the FAVE unit of the copolymer is too high, the water vapor low permeability and the rigidity at high temperatures of the injection molded article deteriorate.

The content of the TFE unit of the copolymer is, with respect to the whole of the monomer units, preferably 93.0 to 95.3% by mass, more preferably 93.1% by mass or higher, and still more preferably 93.2% by mass or higher, further still more preferably 93.3% by mass or higher, especially preferably 93.4% by mass or higher, and most preferably 93.8% by mass or higher, and more preferably 95.2% by mass or lower, still more preferably 95.1% by mass or lower, further still more preferably 95.0% by mass or lower, especially preferably 94.9% by mass or lower, and most preferably 94.8% by mass or lower. Due to that the content of the TFE unit is in the above range, the injection molded article is excellent in physical properties such as the water vapor low permeability, the abrasion resistance, the mechanical property and the rigidity at high temperatures. When the content of the TFE unit of the copolymer is too high, the ozone resistance, the abrasion resistance and the mechanical property of the injection molded article deteriorate. When the content of the TFE unit of the copolymer is too low, the water vapor low permeability and the rigidity at high temperatures of the injection molded article may deteriorate.

In the present disclosure, the content of each monomer unit in the copolymer is measured by a $^{19}$F-NMR method.

The copolymer can also contain a monomer unit originated from a monomer copolymerizable with TFE and FAVE. In this case, the content of the monomer unit copolymerizable with TFE and FAVE is, with respect to the whole of the monomer units of the copolymer, preferably 0 to 2.3% by mass, more preferably 0.05 to 1.5% by mass, and still more preferably 0.1 to 0.5% by mass.

The monomers copolymerizable with TFE and FAVE may include hexafluoropropylene (HFP), vinyl monomers represented by $CZ^1Z^2=CZ^3(CF_2)_nZ^4$ wherein $Z^1$, $Z^2$ and $Z^3$ are identical or different, and represent H or F; $Z^4$ represents H, F or Cl; and n represents an integer of 2 to 10, and alkyl perfluorovinyl ether derivatives represented by $CF_2=CF-OCH_2-Rf^1$ wherein $Rf^1$ represents a perfluoroalkyl group having 1 to 5 carbon atoms. Among these, HFP is preferred.

The copolymer is preferably at least one selected from the group consisting of a copolymer consisting only of the TFE unit and the FAVE unit, and TFE/HFP/FAVE copolymer, and is more preferably a copolymer consisting only of the TFE unit and the FAVE unit.

The melt flow rate (MFR) of the copolymer is 11.0 to 22.0 g/10 min. The MFR of the copolymer is preferably 12.0 g/10 min or higher, and more preferably 13.0 g/10 min or higher, and preferably 21.0 g/10 min or lower, more preferably 20.0 g/10 min or lower, still more preferably 18.0 g/10 min or lower, and especially preferably 17.0 g/10 min or lower. The injection molded article of the present disclosure can be easily produced by injection molding due to containing a copolymer having a relatively high MFR, and furthermore, is excellent in the ozone resistance, while containing the copolymer having such a relatively high MFR copolymer. When the MFR of the copolymer is too high, the injection molded article is inferior in the ozone resistance, the abrasion resistance and the mechanical property. When the MFR of the copolymer is too low, the forming of the copolymer is not easy, and for example, there occur problems such that it is difficult to form the copolymer into a nut provided with a screw thread having a desired shape. When the MFR of the copolymer is too low, the injection molded article is inferior in the water vapor low permeability, the chemical solution low permeability and the rigidity at high temperatures.

In the present disclosure, the MFR is a value obtained as a mass (g/10 min) of the polymer flowing out from a nozzle of 2.1 mm in inner diameter and 8 mm in length per 10 min at 372° C. under a load of 5 kg using a melt indexer, according to ASTM D1238.

The MFR can be regulated by regulating the kind and amount of a polymerization initiator to be used in polymerization of monomers, the kind and amount of a chain transfer agent, and the like.

In the present disclosure, the number of functional groups per $10^6$ main-chain carbon atoms of the copolymer is preferably 20 or less, more preferably 15 or less, and still more preferably less than 6. Due to that the number of functional groups of the copolymer is in the above range, the amount of fluorine ions dissolving out from the injection molded article into water can further easily be reduced, and as a result, the ozone resistance of the injection molded article can easily be improved. Further, due to that the number of functional groups of the copolymer is in the above range, the low permeability of the injection molded article to a chemical solution such as methyl ethyl ketone is improved.

For identification of the kind of the functional groups and measurement of the number of the functional groups, infrared spectroscopy can be used.

The number of the functional groups is measured, specifically, by the following method. First, the copolymer is formed by cold press to prepare a film of 0.25 to 0.30 mm in thickness. The film is analyzed by Fourier transform infrared spectroscopy to obtain an infrared absorption spectrum, and a difference spectrum against a base spectrum that is completely fluorinated and has no functional groups is obtained. From an absorption peak of a specific functional group observed on this difference spectrum, the number N of the functional group per $1 \times 10^6$ carbon atoms in the copolymer is calculated according to the following formula (A).

$$N = I \times K / t \quad (A)$$

I: absorbance
K: correction factor
t: thickness of film (mm)

For reference, for some functional groups, the absorption frequency, the molar absorption coefficient and the correction factor are shown in Table 1. Then, the molar absorption coefficients are those determined from FT-IR measurement data of low molecular model compounds.

TABLE 1

| Functional Group | Absorption Frequency ($cm^{-1}$) | Molar Extinction Coefficient (l/cm/mol) | Correction Factor | Model Compound |
|---|---|---|---|---|
| —COF | 1883 | 600 | 388 | $C_7F_{15}COF$ |
| —COOH free | 1815 | 530 | 439 | $H(CF_2)_6COOH$ |
| —COOH bonded | 1779 | 530 | 439 | $H(CF_2)_6COOH$ |
| —COOCH$_3$ | 1795 | 680 | 342 | $C_7F_{15}COOCH_3$ |
| —CONH$_2$ | 3436 | 506 | 460 | $C_7H_{15}CONH_2$ |
| —CH$_2$OH$_2$, —OH | 3648 | 104 | 2236 | $C_7H_{15}CH_2OH$ |
| —CF$_2$H | 3020 | 8.8 | 26485 | $H(CF_2CF_2)_3CH_2OH$ |
| —CF═CF$_2$ | 1795 | 635 | 366 | $CF_2$═$CF_2$ |

Absorption frequencies of —CH$_2$CF$_2$H, —CH$_2$COF, —CH$_2$COOH, —CH$_2$COOOCH$_3$ and —CH$_2$CONH$_2$ are lower by a few tens of kaysers ($cm^{-1}$) than those of —CF$_2$H, —COF, —COOH free and —COOH bonded, —COOCH$_3$ and —CONH$_2$ shown in the Table, respectively.

For example, the number of the functional group —COF is the total of the number of a functional group determined from an absorption peak having an absorption frequency of 1,883 $cm^{-1}$ derived from —CF$_2$COF and the number of a functional group determined from an absorption peak having an absorption frequency of 1,840 $cm^{-1}$ derived from —CH$_2$COF.

The functional groups are ones present on main chain terminals or side chain terminals of the copolymer, and ones present in the main chain or the side chains. The number of the functional groups may be the total of numbers of —CF═CF$_2$, —CF$_2$H, —COF, —COOH, —COOCH$_3$, —CONH$_2$ and —CH$_2$OH.

The functional groups are introduced to the copolymer by, for example, a chain transfer agent or a polymerization initiator used for production of the copolymer. For example, in the case of using an alcohol as the chain transfer agent, or a peroxide having a structure of —CH$_2$OH as the polymerization initiator, —CH$_2$OH is introduced on the main chain terminals of the copolymer. Alternatively, the functional group is introduced on the side chain terminal of the copolymer by polymerizing a monomer having the functional group.

The copolymer satisfying the above range regarding the number of functional groups can be obtained by subjecting the copolymer to a fluorination treatment. That is, the copolymer contained in the injection molded article of the present disclosure is preferably one which is subjected to the fluorination treatment. Further, the copolymer contained in the injection molded article of the present disclosure preferably has —CF$_3$ terminal groups.

The melting point of the copolymer is preferably 296 to 305° C. and more preferably 299° C. or higher. Due to that the melting point is in the above range, physical properties such as the water vapor low permeability, the chemical solution low permeability, the abrasion resistance, the mechanical property and the rigidity at high temperatures of the injection molded article are further excellent, and the ozone resistance is further improved.

The injection molded article of the present disclosure may contain other components such as fillers, plasticizers, processing aids, mold release agents, pigments, flame retarders, lubricants, light stabilizers, weathering stabilizers, electrically conductive agents, antistatic agents, ultraviolet absorbents, antioxidants, foaming agents, perfumes, oils, softening agents and dehydrofluorination agents.

Examples of the fillers include silica, kaolin, clay, organo clay, talc, mica, alumina, calcium carbonate, calcium terephthalate, titanium oxide, calcium phosphate, calcium fluoride, lithium fluoride, crosslinked polystyrene, potassium titanate, carbon, boron nitride, carbon nanotube and glass fiber. The electrically conductive agents include carbon black. The plasticizers include dioctyl phthalate and pentaerythritol. The processing aids include carnauba wax, sulfone compounds, low molecular weight polyethylene and fluorine-based auxiliary agents. The dehydrofluorination agents include organic oniums and amidines.

As the above-mentioned other components, other polymers other than the copolymer may be used. The other polymers include fluororesins other than the copolymer, fluoroelastomer, and non-fluorinated polymers.

The copolymer contained in the injection molded article of the present disclosure can be produced by a polymerization method such as suspension polymerization, solution polymerization, emulsion polymerization or bulk polymerization. The polymerization method is preferably emulsion polymerization or suspension polymerization. In these polymerization methods, conditions such as temperature and pressure, and a polymerization initiator and other additives can suitably be set depending on the formulation and the amount of the copolymer.

As the polymerization initiator, an oil-soluble radical polymerization initiator, or a water-soluble radical polymerization initiator may be used.

The oil-soluble radical polymerization initiator may be a known oil-soluble peroxide, and examples thereof typically include:
dialkyl peroxycarbonates such as di-n-propyl peroxydicarbonate, diisopropyl peroxydicarbonate, di-sec-butyl peroxydicarbonate and di-2-ethoxyethyl peroxydicarbonate;
peroxyesters such as t-butyl peroxyisobutyrate and t-butyl peroxypivalate;
dialkyl peroxides such as di-t-butyl peroxide; and di[fluoro(or fluorochloro)acyl] peroxides.

The di[fluoro(or fluorochloro)acyl] peroxides include diacyl peroxides represented by [(RfCOO)—]$_2$ wherein Rf is a perfluoroalkyl group, an w-hydroperfluoroalkyl group or a fluorochloroalkyl group.

Examples of the di[fluoro(or fluorochloro)acyl] peroxides include di(ω-hydro-dodecafluorohexanoyl) peroxide, di(ω-hydro-tetradecafluoroheptanoyl) peroxide, di(ω-hydro-hexadecafluorononanoyl) peroxide, di(perfluoropropionyl) peroxide, di(perfluorobutyryl) peroxide, di(perfluorovaleryl) peroxide, di(perfluorohexanoyl) peroxide, di(perfluoroheptanoyl) peroxide, di(perfluorooctanoyl) peroxide, di(perfluorononanoyl) peroxide, di(ci-chloro-hexafluorobutyryl) peroxide, di(ω-chloro-decafluorohexanoyl) peroxide, di(ω-chloro-tetradecafluorooctanoyl) peroxide, ω-hydrodo-decafluoroheptanoyl-ω-hydrohexadecafluorononanoyl peroxide, ω-chloro-hexafluorobutyryl-ω-chloro-decafluorohexanoyl peroxide, ω-hydrododecafluoroheptanoyl-perfluorobutyryl peroxide, di(dichloropentafluorobutanoyl) peroxide, di(trichlorooctafluorohexanoyl) peroxide, di(tetrachloroundecafluorooctanoyl) peroxide, di(pentachlorotetradecafluorodecanoyl) peroxide and di(undecachlorotriacontafluorodocosanoyl) peroxide.

The water-soluble radical polymerization initiator may be a known water-soluble peroxide, and examples thereof include ammonium salts, potassium salts and sodium salts of persulfuric acid, perboric acid, perchloric acid, perphosphoric acid, percarbonic acid and the like, organic peroxides such as disuccinoyl peroxide and diglutaroyl peroxide, and t-butyl permaleate and t-butyl hydroperoxide. A reductant such as a sulfite salt may be combined with a peroxide and used, and the amount thereof to be used may be 0.1 to 20 times with respect to the peroxide.

In the polymerization, a surfactant, a chain transfer agent and a solvent may be used, which are conventionally known.

The surfactant may be a known surfactant, for example, nonionic surfactants, anionic surfactants and cationic surfactants may be used. Among these, fluorine-containing anionic surfactants are preferred, and more preferred are linear or branched fluorine-containing anionic surfactants having 4 to 20 carbon atoms, which may contain an ether bond oxygen (that is, an oxygen atom may be inserted between carbon atoms). The amount of the surfactant to be added (with respect to water in the polymerization) is preferably 50 to 5,000 ppm.

Examples of the chain transfer agent include hydrocarbons such as ethane, isopentane, n-hexane and cyclohexane; aromatics such as toluene and xylene; ketones such as acetone; acetate esters such as ethyl acetate and butyl acetate; alcohols such as methanol and ethanol; mercaptans such as methylmercaptan; and halogenated hydrocarbons such as carbon tetrachloride, chloroform, methylene chloride and methyl chloride. The amount of the chain transfer agent to be added may vary depending on the chain transfer constant value of the compound to be used, but is usually in the range of 0.01 to 20% by mass with respect to the solvent in the polymerization.

The solvent may include water and mixed solvents of water and an alcohol.

In the suspension polymerization, in addition to water, a fluorosolvent may be used. The fluorosolvent may include hydrochlorofluoroalkanes such as $CH_3CClF_2$, $CH_3CCl_2F$, $CF_3CF_2CCl_2H$ and $CF_2ClCF_2CFHCl$; chlorofluoroalaknes such as $CF_2ClCFClCF_2CF_3$ and $CF_3CFClCFClCF_3$; hydrofluroalkanes such as $CF_3CFHCFHCF_2CF_2CF_3$, $CF_2HCF_2CF_2CF_2CF_2H$ and $CF_3CF_2CF_2CF_2CF_2CF_2H$; hydrofluoroethers such as $CH_3OC_2F_5$, $CH_3OC_3F_5CF_3CF_2CH_2OCHF_2$, $CF_3CHFCF_2OCH_3$, $CHF_2CF_2OCH_2F$, $(CF_3)_2CHCF_2OCH_3$, $CF_3CF_2CH_2OCH_2CHF_2$ and $CF_3CHFCF_2OCH_2CF_3$; and perfluoroalkanes such as perfluorocyclobutane, $CF_3CF_2CF_2CF_3$, $CF_3CF_2CF_2CF_2CF_3$ and $CF_3CF_2CF_2CF_2CF_2CF_3$, and among these, perfluoroalkanes are preferred. The amount of the fluorosolvent to be used is, from the viewpoint of the suspensibility and the economic efficiency, preferably 10 to 100% by mass with respect to an aqueous medium.

The polymerization temperature is not limited, and may be 0 to 100° C. The polymerization pressure is suitably set depending on other polymerization conditions to be used such as the kind, the amount and the vapor pressure of the solvent, and the polymerization temperature, but may usually be 0 to 9.8 MPaG.

In the case of obtaining an aqueous dispersion containing the copolymer by the polymerization reaction, the copolymer can be recovered by coagulating, cleaning and drying the copolymer contained in the aqueous dispersion. Then in the case of obtaining the copolymer as a slurry by the polymerization reaction, the copolymer can be recovered by taking out the slurry from a reaction container, and cleaning and drying the slurry. The copolymer can be recovered in a shape of powder by the drying.

The copolymer obtained by the polymerization may be formed into pellets. A method of forming into pellets is not limited, and a conventionally known method can be used. Examples thereof include methods of melt extruding the copolymer by using a single-screw extruder, a twin-screw extruder or a tandem extruder and cutting the resultant into a predetermined length to form the copolymer into pellets. The extrusion temperature in the melt extrusion needs to be varied depending on the melt viscosity and the production method of the copolymer, and is preferably the melting point of the copolymer+20° C. to the melting point of the copolymer+140° C. A method of cutting the copolymer is not limited, and there can be adopted a conventionally known method such as a strand cut method, a hot cut method, an underwater cut method, or a sheet cut method. Volatile components in the obtained pellets may be removed by heating the pellets (degassing treatment). Alternatively, the obtained pellets may be treated by bringing the pellets into contact with hot water of 30 to 200° C., steam of 100 to 200° C. or hot air of 40 to 200° C.

Alternatively, the copolymer obtained by the polymerization may be subjected to fluorination treatment. The fluorination treatment can be carried out by bringing the copolymer having been subjected to no fluorination treatment into contact with a fluorine-containing compound. By the fluorination treatment, thermally unstable functional groups of the copolymer, such as —COOH, —COOCH$_3$, —CH$_2$OH, —COF, —CF═CF$_2$ and —CONH$_2$, and thermally relatively stable functional groups thereof, such as —CF$_2$H, can be converted to thermally very stable —CF$_3$. Consequently, the total number (number of functional groups) of —COOH, —COOCH$_3$, —CH$_2$OH, —COF, —CF═CF$_2$, —CONH$_2$ and —CF$_2$H of the copolymer can easily be controlled in the above-mentioned range.

The fluorine-containing compound is not limited, but includes fluorine radical sources generating fluorine radicals under the fluorination treatment condition. The fluorine radical sources include F$_2$ gas, CoF$_3$, AgF$_2$, UF$_6$, OF$_2$, N$_2$F$_2$, CF$_3$OF, halogen fluorides (for example, IF$_5$ and ClF$_3$).

The fluorine radical source such as F$_2$ gas may be, for example, one having a concentration of 100%, but from the viewpoint of safety, the fluorine radical source is preferably mixed with an inert gas and diluted therewith to 5 to 50% by mass, and then used; and it is more preferably to be diluted to 15 to 30% by mass. The inert gas includes nitrogen gas, helium gas and argon gas, but from the viewpoint of the economic efficiency, nitrogen gas is preferred.

The condition of the fluorination treatment is not limited, and the copolymer in a melted state may be brought into contact with the fluorine-containing compound, but the fluorination treatment can be carried out usually at a temperature of not higher than the melting point of the copolymer, preferably at 20 to 240° C. and more preferably at 100 to 220° C. The fluorination treatment is carried out usually for 1 to 30 hours and preferably 5 to 25 hours. The fluorination treatment is preferred which brings the copolymer having been subjected to no fluorination treatment into contact with fluorine gas (F$_2$ gas).

In the method for producing the copolymer contained in the injection molded article of the present disclosure, it is preferable to use the production method described in Japanese Patent Laid-Open No. 2020-97750.

In the method for producing the copolymer contained in the injection molded article of the present disclosure, it is preferable not to bring the material and copolymer to be used in the production into contact with the metal surface of each facility and piping in each step for producing the copolymer that is subjected to injection molding, such as a polymerization step, a granulation step, a cleaning step, a drying step, a transfer step, a storing step, a pelletization step, a fluorination step, and a product filling step, and it is also preferable to use a material having a low metal content as the material to be used in the production. By such a method, an injection molded article in which the amount of metal dissolving out into 50% by mass hydrofluoric acid is eventually further reduced can easily be obtained.

In the method for producing the copolymer contained in the injection molded article of the present disclosure, it is preferable to use clean and dry air as the air to be used to dry the copolymer and the air to be used in the transfer of the copolymer in each facility. By such a method, an injection molded article in which the amount of metal dissolving out into 50% by mass hydrofluoric acid is eventually further reduced can easily be obtained.

By producing the copolymer as above, a copolymer having, for example, a metal content measured by the ash method of 100 ng/1 g or lower can be obtained. Due to that the injection molded article in which the amount of metal dissolving out into 50% by mass hydrofluoric acid is further reduced can easily be obtained, the metal content of the copolymer subjected to injection molding is preferably 100 ng/1 g or lower, more preferably 60 ng/1 g or lower, still more preferably 50 ng/1 g or lower, especially preferably 40 ng/1 g or lower, and most preferably 30 ng/1 g or lower; and the lower limit is not limited, but may be 1 ng/1 g or higher.

As the method for measuring the metal content in the copolymer, there can be used a method in which the copolymer is ashed in a cuvette in the atomization part of atomic absorption spectrophotometer and the metal content is measured using the atomic absorption spectrophotometer, a method in which the copolymer is weighed in a platinum crucible and ashed using a gas burner or an electric furnace, the ash is dissolved out in acid, and then the metal content is measured using an ICP emission analyzer or a flameless atomic absorption spectrophotometer, or the like.

By injection molding the copolymer obtained as above, the injection molded article can be obtained.

In the production method comprising injection molding a copolymer using an injection molding machine provided with a cylinder and a screw accommodated in the cylinder to obtain an injection molded article, the injection molded article of the present disclosure can suitably be produced by using a copolymer which has a content of the FAVE unit, an MFR and a melting point within the above-mentioned ranges, and has the number of functional groups per 10$^6$ main-chain carbon atoms of 20 or less, and preferably 15 or less.

The production method of the present disclosure, due to having the above configuration, enables an injection molded article in which the amount of fluorine ions dissolving out into water is reduced to be easily obtained, and furthermore, enables an injection molded article in a complicated shape to be easily produced, and for example, enables an injection molded article such as a female joint and a nut to be easily produced.

In the production method of the present disclosure, an injection molded article in which the amount of fluorine ions dissolving out into water is further reduced can be obtained by adjusting the temperature of the cylinder to 385 to 395° C. The cylinder temperature is preferably 392° C. or lower, and is more preferably 390° C. or lower.

In the production method of the present disclosure, an injection molded article in which the amount of metal dissolving out into 50% by mass hydrofluoric acid is reduced can be obtained by using a Ni plated cylinder or a cylinder formed of a Ni-based alloy as the cylinder and a screw formed of a Ni-based alloy and provided with a smear head on a head end as the screw.

The shape of the copolymer to be supplied into an injection molding machine is not limited, and a copolymer in a shape of powder, pellet, or the like can be used.

A known injection molding machine can be used. The copolymer injected from a nozzle of an injection molding machine usually passes through a sprue, a runner, and a gate, flows into a mold cavity, and is filled in the mold cavity. In the mold used for injection molding, a runner and a gate are formed, and a mold cavity for forming an injection molded article is formed.

The shape of the sprue is not limited, and may be a circle, a rectangle, a trapezoid, or the like. The shape of the runner is not limited, and may be a circle, a rectangle, a trapezoid, or the like. The runner type is not limited, and may be a cold runner or a hot runner. The gate type is not limited, and may be a direct gate, a side gate, a submarine gate, or the like. The number of gates to the mold cavity is not limited. Any of the mold having a single-gate structure and the mold having a multi-gate structure may be used. The number of mold cavities of the mold (number of cavities) is preferably 1 to 64.

The injection molded article of the present disclosure can be used in various applications. The injection molded article of the present disclosure may be, for example, nuts, bolts, joints, female joints, films, bottles, gaskets, tubes, hoses, pipes, valves, sheets, seals, packings, tanks, rollers, containers, cocks, connectors, filter housings, filter cages, flowmeters, pumps, wafer carrier, or wafer boxes.

Due to that the injection molded article of the present disclosure is excellent in physical properties such as the water vapor low permeability, the chemical solution low permeability, the abrasion resistance, the mechanical property and the rigidity at high temperatures, and is also remarkably excellent in the ozone resistance, the injection molded article can suitably be utilized for nuts, bolts, joints, packings, valves, cocks, connectors, filter housings, filter cages, flowmeters, pumps, and the like. For example, the injection molded article of the present disclosure can suitably be utilized as piping members (in particular, housings of valves and filter cages) to be used in the transfer of chemical solutions, and flowmeter frames provided with flow paths for chemical solutions in flowmeters. The piping member and flowmeter frame of the present disclosure are excellent in physical properties such as the water vapor low permeability, the chemical solution low permeability, the abrasion resistance, the mechanical property and the rigidity at high temperatures, and are also remarkably excellent in the ozone resistance. Further, the piping member and flowmeter frame of the present disclosure can be produced at a significantly high injection speed without causing corrosion of a mold used in forming even in the case of having a thin-wall part, and have a beautiful appearance.

The injection molded article of the present disclosure can be suitably utilized as members to be compressed such as gaskets and packings which are excellent in physical properties such as the water vapor low permeability, the chemical solution low permeability, the abrasion resistance, the mechanical property and the rigidity at high temperatures, and also remarkably excellent in the ozone resistance.

The injection molded article of the present disclosure can be suitably utilized as bottles or tubes which are excellent in physical properties such as the water vapor low permeability, the chemical solution low permeability, the abrasion resistance, the mechanical property and the rigidity at high temperatures, and also remarkably excellent in the ozone resistance. The bottles or tubes of the present disclosure are hardly damaged during use.

The injection molded article of the present disclosure is excellent in physical properties such as the water vapor low permeability, the chemical solution low permeability, the abrasion resistance, the mechanical property and the rigidity at high temperatures, and is also remarkably excellent in the ozone resistance. Therefore, the injection molded article of the present disclosure can suitably be utilized for housings of valves and valves. The valves of the present disclosure can be produced in low cost, and furthermore, in an extremely high productivity without corroding molds, and are excellent in physical properties such as the water vapor low permeability, the chemical solution low permeability, the abrasion resistance, the mechanical property and the rigidity at high temperatures.

Although the embodiments have been described above, it will be understood that various changes in form and details are possible without departing from the gist and scope of the claims.

According to the present disclosure, there is provided an injection molded article comprising a copolymer comprising tetrafluoroethylene unit and a fluoro(alkyl vinyl ether) unit, wherein the content of the fluoro(alkyl vinyl ether) unit of the copolymer is 4.7 to 7.0% by mass with respect to the whole of the monomer units, the melt flow rate at 372° C. of the copolymer is 11.0 to 22.0 g/10 min, the melting point of the copolymer is 296 to 305° C., and the amount of fluorine ions dissolving out from the injection molded article into water is 7,500 µg/m$^2$ or lower.

In the injection molded article of the present disclosure, the amount of fluorine ions dissolving out from the injection molded article into water is preferably 5,500 µg/m$^2$ or lower.

In the injection molded article of the present disclosure, the amount of metal dissolving out from the injection molded article into 50% by mass hydrofluoric acid is preferably 200 µg/m$^2$ or lower.

In the injection molded article of the present disclosure, the fluoro(alkyl vinyl ether) unit of the copolymer is preferably perfluoro(propyl vinyl ether) unit.

In the injection molded article of the present disclosure, the content of the fluoro(alkyl vinyl ether) unit of the copolymer is preferably 4.9 to 6.9% by mass with respect to the whole of the monomer units.

In the injection molded article of the present disclosure, the melt flow rate at 372° C. of the copolymer is preferably 13.0 to 20.0 g/10 min.

In the injection molded article of the present disclosure, the number of functional groups of the copolymer is preferably 20 or less per 10$^6$ main-chain carbon atoms.

The injection molded article of the present disclosure is preferably a nut.

According to the present disclosure, there is provided a method for producing the above injection molded article, comprising injection molding the copolymer using an injection molding machine provided with a cylinder and a screw accommodated in the cylinder, to obtain the injection molded article.

In the production method of the present disclosure, the temperature of the copolymer in the cylinder is preferably adjusted to 385 to 395° C.

In the production method of the present disclosure, a Ni plated cylinder or a cylinder formed of a Ni-based alloy is preferably used as the cylinder, and a screw formed of a Ni-based alloy and provided with a smear head on a head end is preferably used as the screw.

EXAMPLES

Next, embodiments of the present disclosure will be described with reference to experimental examples, but the present disclosure is not intended to be limited by these experimental examples.

The numerical values of the experimental examples were measured by the following methods.
(Content of Monomer Unit)

The content of each monomer unit was measured by an NMR analyzer (for example, manufactured by Bruker BioSpin GmbH, AVANCE 300, high-temperature probe).
(Melt Flow Rate (MFR))

The polymer was made to flow out from a nozzle of 2.1 mm in inner diameter and 8 mm in length at 372° C. under a load of 5 kg by using a Melt Indexer G-01 (manufactured by Toyo Seiki Seisaku-sho, Ltd.) according to ASTM D1238, and the mass (g/10 min) of the polymer flowing out per 10 min was determined.
(Melting Point)

The polymer was heated, as a first temperature raising step at a temperature-increasing rate of 10° C./min from 200° C. to 350° C., then cooled at a cooling rate of 10° C./min from 350° C. to 200° C., and then again heated, as second temperature raising step, at a temperature-increasing rate of 10° C./min from 200° C. to 350° C. by using a differential scanning calorimeter (trade name: X-DSC7000, manufactured by Hitachi High-Tech Science Corp.); and the melting point was determined from a melting curve peak observed in the second temperature raising step.
(Number of Functional Groups)

Pellets of the copolymer was formed by cold press into a film of 0.25 to 0.30 mm in thickness. The film was 40 times scanned and analyzed by a Fourier transform infrared spectrometer [FT-IR (Spectrum One, manufactured by PerkinElmer, Inc.)] to obtain an infrared absorption spectrum, and a difference spectrum against a base spectrum that is completely fluorinated and has no functional groups is obtained. From an absorption peak of a specific functional group observed on this difference spectrum, the number N of the functional group per $1 \times 10^6$ carbon atoms in the sample was calculated according to the following formula (A).

$$N = I \times K/t \quad (A)$$

I: absorbance

K: correction factor t: thickness of film (mm)

Regarding the functional groups in the present disclosure, for reference, the absorption frequency, the molar absorption coefficient and the correction factor are shown in Table 2. The molar absorption coefficients are those determined from FT-IR measurement data of low molecular model compounds.

TABLE 2

| Functional Group | Absorption Frequency ($cm^{-1}$) | Molar Extinction Coefficient (l/cm/mol) | Correction Factor | Model Compound |
|---|---|---|---|---|
| —COF | 1883 | 600 | 388 | $C_7F_{15}COF$ |
| —COOH free | 1815 | 530 | 439 | $H(CF_2)_6COOH$ |
| —COOH bonded | 1779 | 530 | 439 | $H(CF_2)_6COOH$ |
| —COOCH$_3$ | 1795 | 680 | 342 | $C_7F_{15}COOCH_3$ |
| —CONH$_2$ | 3436 | 506 | 460 | $C_7H_{15}CONH_2$ |
| —CH$_2$OH$_2$, —OH | 3648 | 104 | 2236 | $C_7H_{15}CH_2OH$ |
| —CF$_2$H | 3020 | 8.8 | 26485 | $H(CF_2CF_2)_3CH_2OH$ |
| —CF═CF$_2$ | 1795 | 635 | 366 | $CF_2$═$CF_2$ |

Synthesis Example 1

Pellets were obtained in the same manner as described in Example 1 of Japanese Patent Laid-Open No. 2020-97750, except for changing the charged amount of pure water to 49.0 L, changing the charged amount of perfluorocyclobutane to 40.7 kg, changing the charged amount of perfluoro (propyl vinyl ether) (PPVE) to 1.61 kg, changing the charged amount of methanol to 1.02 kg, introducing tetrafluoroethylene (TFE) under pressure up to 0.64 MPa, charging 0.041 kg of a 50% methanol solution of di-n-propyl peroxydicarbonate instead of di-sec-butyl peroxydicarbonate, adding 0.052 kg of PPVE for every 1 kg of TFE supplied, and changing the polymerization time to 18 hours. By using the obtained pellets, the PPVE content was measured by the above-mentioned method. The results are shown in Table 3.

The obtained pellets were put in a vacuum vibration-type reactor VVD-30 (manufactured by Okawara MFG. Co., Ltd.), and heated to 210° C. After vacuumizing, $F_2$ gas diluted to 20% by volume with $N_2$ gas was introduced to the atmospheric pressure. 0.5 hour after the $F_2$ gas introduction, vacuumizing was once carried out and the $F_2$ gas was again introduced. Further, 0.5 hour thereafter, vacuumizing was again carried out and $F_2$ gas was again introduced. Thereafter, while the above operation of the $F_2$ gas introduction and the vacuumizing was carried out once every 1 hour, the reaction was carried out at a temperature of 210° C. for 10 hours. After the reaction was finished, the reactor interior was replaced sufficiently by $N_2$ gas to finish the fluorination reaction. By using the fluorinated pellets, the above physical properties were measured by the methods described above. The results are shown in Table 3.

Synthesis Example 2

Pellets were obtained in the same manner as described in Example 1 of Japanese Patent Laid-Open No. 2020-97750, except for changing the charged amount of pure water to 49.0 L, changing the charged amount of perfluorocyclobutane to 40.7 kg, changing the charged amount of perfluoro(propyl vinyl ether) (PPVE) to 2.58 kg, changing the charged amount of methanol to 2.24 kg, introducing tetrafluoroethylene (TFE) under pressure up to 0.64 MPa, charging 0.041 kg of a 50% methanol solution of di-n-propyl peroxydicarbonate instead of di-sec-butyl peroxydicarbonate, adding 0.071 kg of PPVE for every 1 kg of TFE supplied, and changing the polymerization time to 19 hours. By using the obtained pellets, the PPVE content was measured by the above-mentioned method. The results are shown in Table 3.

Fluorinated pellets were obtained as in Synthesis Example 1, except for using the obtained pellets. The results are shown in Table 3.

Synthesis Example 3

Pellets were obtained in the same manner as described in Example 1 of Japanese Patent Laid-Open No. 2020-97750, except for changing the charged amount of pure water to 49.0 L, changing the charged amount of perfluorocyclobutane to 40.7 kg, changing the charged amount of perfluoro(propyl vinyl ether) (PPVE) to 1.90 kg, changing the charged amount of methanol to 1.50 kg, introducing tetrafluoroethylene (TFE) under pressure up to 0.64 MPa, charging 0.041 kg of a 50% methanol solution of di-n-propyl peroxydicarbonate instead of di-sec-butyl peroxydicarbonate, adding 0.057 kg of PPVE for every 1 kg of TFE supplied, and changing the polymerization time to 18 hours. By using the obtained pellets, the PPVE content was measured by the above-mentioned method. The results are shown in Table 3.

Fluorinated pellets were obtained as in Synthesis Example 1, except for using the obtained pellets. The results are shown in Table 3.

Synthesis Example 4

Pellets were obtained in the same manner as described in Example 1 of Japanese Patent Laid-Open No. 2020-97750, except for changing the charged amount of pure water to 49.0 L, changing the charged amount of perfluorocyclobutane to 40.7 kg, changing the charged amount of perfluoro(propyl vinyl ether) (PPVE) to 2.12 kg, changing the charged amount of methanol to 1.80 kg, introducing tetrafluoroethylene (TFE) under pressure up to 0.64 MPa, charging 0.041 kg of a 50% methanol solution of di-n-propyl peroxydicarbonate instead of di-sec-butyl peroxydicarbonate, adding 0.062 kg of PPVE for every 1 kg of TFE supplied, and changing the polymerization time to 19 hours. By using the obtained pellets, the PPVE content was measured by the above-mentioned method. The results are shown in Table 3.

Fluorinated pellets were obtained as in Synthesis Example 1, except for using the obtained pellets. The results are shown in Table 3.

Synthesis Example 5

Pellets were obtained in the same manner as described in Example 1 of Japanese Patent Laid-Open No. 2020-97750, except for changing the charged amount of pure water to 51.8 L, changing the charged amount of perfluorocyclobutane to 40.9 kg, changing the charged amount of perfluoro(propyl vinyl ether) (PPVE) to 2.75 kg, changing the charged amount of methanol to 2.38 kg, introducing tetrafluoroethylene (TFE) under pressure up to 0.64 MPa, charging 0.051 kg of a 50% methanol solution of di-n-propyl peroxydicarbonate instead of di-sec-butyl peroxydicarbonate, adding 0.058 kg of PPVE for every 1 kg of TFE supplied, finishing the polymerization at the time when the amount of TFE additionally charged reached 40.9 kg, to thereby obtain 43.3 kg of a dry powder. By using the obtained pellets, the PPVE content was measured by the above-mentioned method. The results are shown in Table 3.

Fluorinated pellets were obtained as in Synthesis Example 1, except for using the obtained pellets, changing the raised temperature of the vacuum vibration-type reactor to 170° C., and changing the reaction condition to at 170° C. and for 5 hours. The results are shown in Table 3.

Synthesis Example 6

Pellets were obtained in the same manner as described in Example 1 of Japanese Patent Laid-Open No. 2020-97750, except for changing the charged amount of pure water to 26.6 L, changing the charged amount of perfluoro(propyl vinyl ether) (PPVE) to 1.25 kg, changing the charged amount of methanol to 2.17 kg, introducing tetrafluoroethylene (TFE) under pressure up to 0.58 MPa, charging 0.044 kg of a 50% methanol solution of di-n-propyl peroxydicarbonate instead of di-sec-butyl peroxydicarbonate, adding 0.044 kg of PPVE for every 1 kg of TFE supplied, and changing the polymerization time to 8.5 hours. By using the obtained pellets, the PPVE content was measured by the above-mentioned method. The results are shown in Table 3.

Fluorinated pellets were obtained as in Synthesis Example 1, except for using the obtained pellets. The results are shown in Table 3.

Synthesis Example 7

Pellets were obtained in the same manner as described in Example 1 of Japanese Patent Laid-Open No. 2020-97750, except for changing the charged amount of pure water to 26.6 L, changing the charged amount of perfluoro(propyl vinyl ether) (PPVE) to 1.32 kg, changing the charged amount of methanol to 2.20 kg, introducing tetrafluoroethylene (TFE) under pressure up to 0.58 MPa, charging 0.044 kg of a 50% methanol solution of di-n-propyl peroxydicarbonate instead of di-sec-butyl peroxydicarbonate, adding 0.046 kg of PPVE for every 1 kg of TFE supplied, and changing the polymerization time to 8.5 hours. By using the obtained pellets, the PPVE content was measured by the above-mentioned method. The results are shown in Table 3.

Fluorinated pellets were obtained as in Synthesis Example 1, except for using the obtained pellets. The results are shown in Table 3.

Synthesis Example 8

Pellets were obtained in the same manner as described in Example 1 of Japanese Patent Laid-Open No. 2020-97750, except for changing the charged amount of pure water to 49.0 L, changing the charged amount of perfluorocyclobutane to 40.7 kg, changing the charged amount of perfluoro(propyl vinyl ether) (PPVE) to 1.90 kg, changing the charged amount of methanol to 3.40 kg, introducing tetrafluoroethylene (TFE) under pressure up to 0.64 MPa, charging 0.041 kg of a 50% methanol solution of di-n-propyl peroxydicarbonate instead of di-sec-butyl peroxydicarbonate, adding 0.057 kg of PPVE for every 1 kg of TFE supplied, and changing the polymerization time to 19 hours. By using the obtained pellets, the PPVE content was measured by the above-mentioned method. The results are shown in Table 3.

Fluorinated pellets were obtained as in Synthesis Example 1, except for using the obtained pellets. The results are shown in Table 3.

Synthesis Example 9

Pellets were obtained in the same manner as described in Example 1 of Japanese Patent Laid-Open No. 2020-97750, except for changing the charged amount of pure water to 51.8 L, changing the charged amount of perfluorocyclobutane to 40.9 kg, changing the charged amount of perfluoro (propyl vinyl ether) (PPVE) to 3.47 kg, changing the charged amount of methanol to 3.28 kg, introducing tetrafluoroethylene (TFE) under pressure up to 0.64 MPa, charging 0.026 kg of a 50% methanol solution of di-n-propyl peroxydicarbonate instead of di-sec-butyl peroxydicarbonate, adding 0.071 kg of PPVE for every 1 kg of TFE supplied, finishing the polymerization at the time when the amount of TFE additionally charged reached 40.9 kg, to thereby obtain 43.8 kg of a dry powder. By using the obtained pellets, the PPVE content was measured by the above-mentioned method. The results are shown in Table 3.

Fluorinated pellets were obtained as in Synthesis Example 1, except for using the obtained pellets. The results are shown in Table 3.

TABLE 3

| | PPVE content (% by mass) | MFR (g/10 min) | Melting point (° C.) | Number of functional groups (number/C10$^8$) |
|---|---|---|---|---|
| Synthesis Example 1 | 4.9 | 13.0 | 303 | <6 |
| Synthesis Example 2 | 6.6 | 20.0 | 299 | <6 |
| Synthesis Example 3 | 5.4 | 15.0 | 302 | <6 |
| Synthesis Example 4 | 5.8 | 17.0 | 302 | <6 |
| Synthesis Example 5 | 5.5 | 14.8 | 302 | 28 |
| Synthesis Example 6 | 4.2 | 16.2 | 304 | <6 |
| Synthesis Example 7 | 4.4 | 17.6 | 304 | <6 |
| Synthesis Example 8 | 5.4 | 25.0 | 302 | <6 |
| Synthesis Example 9 | 6.6 | 9.0 | 298 | <6 |

The description of "<6" in Table 3 means that the number of functional groups is less than 6.

Experimental Examples 1 to 5 and Comparative Examples 2 to 5

Forming was carried out in a clean room of class 10000 using an injection molding machine (SE50EV-A, manufactured by Sumitomo Heavy Industries, Ltd.). As the screw of the injection molding machine, a screw in which a smear head is provided on a screw head was used, and the material of the screw and the cylinder of the injection molding machine was a Ni-based alloy. By setting the maximum temperature of the cylinder of the injection molding machine as described in Table 4 and setting the mold temperature to 200° C. and the injection speed to 20 mm/s, the copolymer was injection molded to prepare a sheet-shape injection molded article (40 mm×40 mm×0.5 mmt). The mold used was a mold (4 cavities of 40 cm×40 cm×0.5 mmt, side gate) Ni plated on HPM38.

Injection molding of the copolymer was repeated 100 times, the molding machine and the heater were stopped, and after 22 hours, the molding machine was operated again, and injection molding of the polymer was repeated further 100 times.

Experimental Example 6 and Comparative Example 1

Forming was carried out by using an injection molding machine (manufactured by Sumitomo Heavy Industries, Ltd., SE50EV-A). As the screw of the injection molding machine, a screw in which a screw head configured from a screw head, a non-return ring and a seal ring (three-piece set) is provided was used, and the material of the screw and the cylinder of the injection molding machine was stainless, on which surface Cr was plated. By setting the maximum temperature of the cylinder of the injection molding machine as described in Table 4 and setting the mold temperature to 200° C. and the injection speed to 20 mm/s, the copolymer was injection molded to prepare a sheet-shape injection molded article (40 mm×40 mm×0.5 mmt). The mold used was a mold (4 cavities of 40 mm×40 mm×0.5 mmt, side gate) made of HPM38.

Injection molding of the copolymer was repeated 100 times, the molding machine and the heater were stopped, and after 22 hours, the molding machine was operated again, and injection molding of the polymer was repeated further 100 times.

By using the injection molded articles obtained in Experimental Examples and Comparative Examples, the amount of fluorine ions dissolving out and the amount of metal dissolving out were measured by the following methods. The results are shown in Table 4.

(Measurement of Amount of Fluorine Ions Dissolving Out)

In the measurement of the amount of fluorine ions dissolving out, the injection molded article obtained in the 199th injection molding was used. Four sheet-shape injection molded articles (40 mm×40 mm×0.5 mmt) were cut from the runner of the obtained injection molded article using ceramic scissors. All the four sheet-shape injection molded articles were immersed in 14 g of pure water, heated in a sterilization machine at 121° C. for 1 hour, then the injection molded articles were taken out from the obtained water, and the fluorine ion concentration of the remaining water was measured with a fluorine ion meter. From the obtained measured value, the amount of fluorine ions dissolving out per surface area of the injection molded article was calculated according to the following formula.

Amount of fluorine ions dissolving out (μg/m$^2$)=measured value (μg/g)×amount of pure water (g)/total surface area of four sheet-shape injection molded articles (m$^2$)

(Measurement of Amount of Metal Dissolving Out)

In the measurement of the amount of fluorine ions dissolving out, the injection molded article obtained in the 200th injection molding was used. As the container used in the measurement, a container made of PFA which was immersed in 50% by mass hydrofluoric acid at 25° C. for 7 days, and then washed with ultrapure water was used.

Four sheet-shape injection molded articles (40 mm×40 mm×0.5 mmt) were cut from the runner of the obtained injection molded article using ceramic scissors. All the four sheet-shape injection molded articles were immersed in 50% by mass hydrofluoric acid at 25° C. for 24 hours in the container made of PFA, and then the injection molded articles were taken out. Subsequently, the container made of PFA was installed in a water bath and heated to completely evaporate the moisture from hydrofluoric acid, and then a 0.1 N nitric acid aqueous solution was added to prepare a solution for measurement. At the same time, only hydrofluoric acid was allowed to stand at 25° C. for 24 hours in a container made of PFA, and a solution for reference was prepared in the same manner as above.

Using an ICP emission analyzer (SPECTROBLUE TI, manufactured by SPECTRO Analytical Instruments GmbH), the concentration of iron, chrome, and nickel (metal concentration) in the solution for measurement and the solution for reference was measured. From the obtained measured value, the amount of metal dissolving out per surface area of the injection molded article was calculated according to the following formula.

Amount of metal dissolving out ($\mu g/m^2$)=[metal concentration in solution for measurement (ng/g)−metal concentration in solution for reference (ng/g)]×amount of 50% by mass hydrofluoric acid (g)×0.001 ($\mu$g/ng)/total surface area of four injection molded articles ($m^2$)

Experimental Examples 7 to 10 and Comparative Examples 6 to 9

Forming was carried out in a clean room of class 10000 using an injection molding machine (IS130FI, manufactured by Toshiba Machine Co., Ltd.). As the screw of the injection molding machine, a screw in which a smear head is provided on a screw head was used, and the material of the screw and the cylinder of the injection molding machine was a Ni-based alloy. By setting the maximum temperature of the cylinder of the injection molding machine to 390° C., the mold temperature to 200° C. and the injection speed to 5 mm/s, the copolymer was injection molded to prepare a sheet-shape injection molded article (130 mm×130 mm×3 mmt). The mold used was a mold (130 mm×130 mm×3 mmt, side gate, flow length from the gate: more than 130 mm) Ni plated on HPM38.

Injection molding of the copolymer was repeated 100 times, the molding machine and the heater were stopped, and after 22 hours, the molding machine was operated again, and injection molding of the polymer was repeated further 100 times.

By using the injection molded articles obtained in Experimental Examples and Comparative Examples, the amount of fluorine ions dissolving out and the amount of metal dissolving out were measured by the method described above. The results are shown in Table 5.

The injection moldability of the copolymers used in Experimental Examples 7 to 10 and Comparative Examples 6 to 9 was evaluated by the following method. The results are shown in Table 5.

(Injection Moldability)

The obtained injection molded article was observed and evaluated according to the following criteria. The presence/absence of roughness of the surface was checked by touching the surface of the injection molded article.

3: The entire surface was flat, and no flow marks were observed on the entire formed article 2: Roughness was observed on the surface within the region of 1 cm from the portion where the gate of the mold had been positioned, but the entire surface was flat in other regions and no flow marks were observed on the entire formed article 1: Roughness was observed on the surface within the region of 1 cm from the portion where the gate of the mold had been positioned, and while a flow mark was observed on the surface within the region of 1 cm from the portion where the gate of the mold had been positioned, the entire surface was flat and no flow marks were observed on other regions 0: Roughness was observed on the surface within the region of 4 cm from the portion where the gate of the mold had been positioned, and a flow mark was observed within the region of 4 cm from the portion where the gate of the mold had been positioned Using the injection molded articles obtained in Experimental Examples and Comparative Examples, an ozone exposure test was carried out. The injection molded articles obtained in Experimental Examples and Comparative Examples were evaluated by the following method. The results are shown in Table 4 and Table 5.

(Ozone Exposure Test)

Ozone gas (ozone/oxygen=10/90 capacity %) generated in an ozone generation apparatus (trade name: SGX-A11MN (revised), manufactured by SUMITOMO PRECISION PRODUCTS Co., Ltd.) was connected to a container made of PFA in which ion-exchange water was put, bubbled into the ion-exchange water to add water vapor to the ozone gas, and thereafter, passed through a cell made of PFA in which the sheet-shape injection molded article was put at 0.7 liter/min at room temperature, thereby exposing the sample to wet ozone gas. The sample was taken out 120 days after the start of the exposure, the surface was gently rinsed with ion-exchange water, and thereafter, the portion with a depth of 5 to 200 $\mu$m from the sample surface was observed using a transmission type optical microscope at a magnification of ×100 and photographed with a standard scale, and the number of cracks having a length of 10 $\mu$m or larger per 1 $mm^2$ of the sample surface and evaluated by the following criteria.

Good: number of cracks is 10 or less
Fair: number of cracks is more than 10 and 50 or less
Poor: number of cracks is more than 50

(Water Vapor Permeability)

The sheet-shape injection molded article was allowed to stand at 60° C. for 24 hours, and then a test piece was prepared from the injection molded article. 10 g of water was put in a test cup (permeation area: 7.065 $cm^2$), and the test cup was covered with the sheet-shape test piece; and a PTFE gasket was pinched and fastened to hermetically close the test cup. The sheet-shape test piece was brought into contact with water, and held at a temperature of 95° C. for 60 days, and thereafter, the test cup was taken out and allowed to stand at room temperature for 2 hours; thereafter, the amount of the mass lost was measured. The water vapor permeability ($g/m^2$) was determined by the following formula.

Water vapor permeability ($g/m^2$)=amount of mass lost (g)/permeation area ($m^2$)

(Methyl Ethyl Ketone (MEK) Permeability)

The sheet-shape injection molded article was allowed to stand at 60° C. for 24 hours, and then a sheet-shape test piece was prepared from the injection molded article. 10 g of MEK was put in a test cup (permeation area: 12.56 cm$^2$), and the test cup was covered with the sheet-shape test piece; and a PTFE gasket was pinched and fastened to hermetically close the test cup. The sheet-shape test piece was brought into contact with the MEK, and held at a temperature of 60° C. for 60 days, and thereafter, the test cup was taken out and allowed to stand at room temperature for 1 hour; thereafter, the amount of the mass lost was measured. The MEK permeability (g/m$^2$) was determined by the following formula.

MEK permeability (g/m$^2$)=amount of mass lost (g)/permeation area (m$^2$)

(Abrasion Test)

The sheet-shape injection molded article was allowed to stand at 60° C. for 24 hours, and then used as a test piece. The test piece was fixed on a test bench of a Taber abrasion tester (No. 101 Taber type abrasion tester with an option, manufactured by YASUDA SEIKI SEISAKUSHO, LTD.) and the abrasion test was carried out under the conditions of at a load of 500 g, using an abrasion wheel CS-10 (rotationally polished in 20 rotations with an abrasive paper #240) and at a rotation rate of 60 rpm by using the Taber abrasion tester. The weight of the test piece after 1,000 rotations was measured, and the same test piece was further subjected to the test of 10,000 rotations and thereafter, the weight thereof was measured. The abrasion loss was determined by the following formula.

Abrasion loss (mg)=$M1-M2$

M1: the weight of the test piece after the 1,000 rotations (mg)

M2: the weight of the test piece after the 10,000 rotations (mg)

(Load Deflection Rate at 95° C.)

After the sheet-shape injection molded article was allowed to stand at 60° C. for 24 hours, a test piece of 80 mm×10 mm was cut out from the injection molded article and heated in an electric furnace at 100° C. for 20 hours. Except for using the obtained test piece, the test was carried out according to a method described in JIS K-K 7191-1 using a heat distortion tester (manufactured by YASUDA SEIKI SEISAKUSHO, LTD.) under the conditions of at a test temperature of 30 to 150° C., a temperature-increasing rate of 120° C./hour, a bending stress of 1.8 MPa and a flatwise method. The load deflection rate was determined by the following formula. A sheet having a low load deflection rate at 95° C. is excellent in the rigidity at high temperatures.

Load deflection rate (%)=$a2/a1 \times 100$ a1: the test piece thickness before test (mm)

a2: the amount of deflection at 95° C. (mm)

The above results are shown in Table 4 and Table 5.

TABLE 4

| | Type of copolymer | Cylinder temperature (° C.) | Amount of fluorine ions dissolving out (Water) (μg/m$^2$) | Amount of metal dissolving out (HF) (μg/m$^2$) | Ozone exposure test 120 days | Water vapor permeability (g/m$^2$) | MEK permeability (g/m$^2$) |
|---|---|---|---|---|---|---|---|
| Experimental Example 1 | Synthesis Example 1 | 395 | 4375 | 29.2 | Good | 480 | 81.5 |
| Experimental Example 2 | Synthesis Example 2 | 390 | 2348 | 9.6 | Good | 568 | 83.5 |
| Experimental Example 3 | Synthesis Example 3 | 390 | 3841 | 16.4 | Good | 500 | 81.6 |
| Experimental Example 4 | Synthesis Example 4 | 385 | 3735 | 12.9 | Good | 516 | 82.3 |
| Experimental Example 5 | Synthesis Example 4 | 400 | 7149 | 29.1 | Fair | — | — |
| Experimental Example 6 | Synthesis Example 3 | 390 | 4055 | 981.0 | Fair | — | — |
| Comparative Example 1 | Synthesis Example 5 | 400 | 18674 | 1177.2 | Poor | 508 | 85.5 |
| Comparative Example 2 | Synthesis Example 6 | 390 | 2774 | 12.2 | Poor | 396 | 78.6 |
| Comparative Example 3 | Synthesis Example 7 | 390 | 3201 | 14.4 | Poor | 404 | 76.4 |
| Comparative Example 4 | Synthesis Example 8 | 390 | 4162 | 20.1 | Poor | 452 | 77.7 |
| Comparative Example 5 | Synthesis Example 9 | 390 | 2348 | 9.6 | Good | 660 | 89.6 |

TABLE 5

| | Type of copolymer | Injection moldability | Cylinder temperature (° C.) | Amount of fluorine ions dissolving out (Water) ($\mu g/m^2$) | Amount of metal dissolving out (HF) ($\mu g/m^2$) | Ozone exposure test 120 days | Abrasion loss (mg) | Load deflection at 95° C. (%) |
|---|---|---|---|---|---|---|---|---|
| Experimental Example 7 | Synthesis Example 1 | 3 | 390 | 3713 | 24.8 | Good | 16.9 | 56% |
| Experimental Example 8 | Synthesis Example 2 | 3 | 390 | 2277 | 9.3 | Good | 15.1 | 70% |
| Experimental Example 9 | Synthesis Example 3 | 3 | 390 | 3726 | 15.9 | Good | 16.8 | 60% |
| Experimental Example 10 | Synthesis Example 4 | 3 | 390 | 4140 | 14.3 | Good | 16.5 | 63% |
| Comparative Example 6 | Synthesis Example 6 | 3 | 390 | 2691 | 11.8 | Poor | 20.6 | 48% |
| Comparative Example 7 | Synthesis Example 7 | 3 | 390 | 3105 | 14.0 | Poor | 20.5 | 49% |
| Comparative Example 8 | Synthesis Example 8 | 3 | 390 | 4037 | 19.5 | Poor | 20.6 | 57% |
| Comparative Example 9 | Synthesis Example 9 | 2 | 390 | 2277 | 9.3 | Good | 12.1 | 76% |

Experimental Examples 11 to 14 and Comparative Examples 10 to 12 and 14

(Preparation of Nut)

Nuts having a shape shown in the FIGURE were prepared by injection molding the copolymers of Synthesis Examples 1 to 4 and 6 to 9 as in Experimental Example 1, except for changing the maximum temperature of the cylinder to 390° C., the mold temperature to 150° C., and the injection speed to 5 mm/s, and changing the mold. The mold used was a mold (cap nut, screw thread section M (lower inner diameter)=36 mm, e (one side of hexagon)=46.2 mm, S (outer diameter)=40 mm, D (upper inner diameter)=27 mm, H (height)=30 mm, h (inner height)=24 mm, single side gate) Ni plated on HPM38.

Comparative Example 13

(Preparation of Nut)

A nut having a shape shown in the FIGURE was prepared by injection molding the copolymer of Synthesis Example 5 as in Comparative Example 1, except for changing the maximum temperature of the cylinder to 400° C., the mold temperature to 150° C., and the injection speed to 5 mm/s, and changing the mold. The mold used was a mold (cap nut, screw thread section M=36 mm, e=46.2 mm, S=40 mm, D=27 mm, H=30 mm, h=24 mm, single side gate) made of HPM38.

By using the nuts obtained in Experimental Examples and Comparative Examples, the amount of fluorine ions dissolving out and the amount of metal dissolving out were measured by the method described above. The results are shown in Table 6.

The nuts obtained in Experimental Examples and Comparative Examples were evaluated by the following method. The results are shown in Table 6.

(Transfer Property)

The transfer property of the screw thread section of the obtained nut was visually checked.

Good: the shape of the mold was reliably transferred to the injection molded article, and the screw thread section in a desired shape was formed Poor: a part of the shape of the mold was not transferred to the injection molded article, and a screw thread section in a shape different from the desired shape was observed (Tensile Test)

To measure the strength of the nut, a nut strength breaking test was carried out. In the tensile test, a tensilon universal tester (UCT-500 manufactured by ORIENTEC CO., LTD.) was used, the tensile test was carried out by hooking the upper jig in a disk shape on the top surface of the nut, inserting the lower jig in a screw shape into the nut, and setting the distance between the upper jig and the lower jig to 1 mm and the tensile rate to 0.5 mm/min, and the tensile test was stopped at the time point when generation of a crack was visually observed on the upper part of the nut in the tensile test. The load (breaking load) at the time when the tensile test was stopped was measured and evaluated by the following criteria.

Good: breaking load: 440 N or higher

Fair: breaking load: 430 to 440 N

Poor: breaking load: 430 N or lower (Ozone Exposure Test)

The number of cracks was measured as in the above ozone exposure test, except for changing the sample from the sheet-shape injection molded article to the nut, and evaluated by the same criteria.

The results of the above measurements are shown in Table 6.

TABLE 6

| | Type of copolymer | Cylinder temperature (° C.) | Amount of fluorine ions dissolving out (Water) (μg/m$^2$) | Amount of metal dissolving out (HF) (μg/m$^2$) | Transfer property | Tensile test | Ozone exposure test 120 days |
|---|---|---|---|---|---|---|---|
| Experimental Example 11 | Synthesis Example 1 | 390 | 3778 | 24.7 | Good | Fair | Good |
| Experimental Example 12 | Synthesis Example 2 | 390 | 2340 | 9.4 | Good | Good | Good |
| Experimental Example 13 | Synthesis Example 3 | 390 | 3802 | 15.9 | Good | Good | Good |
| Experimental Example 14 | Synthesis Example 4 | 390 | 4233 | 14.3 | Good | Good | Good |
| Comparative Example 10 | Synthesis Example 6 | 390 | 2711 | 11.7 | Good | Poor | Poor |
| Comparative Example 11 | Synthesis Example 7 | 390 | 3128 | 13.8 | Good | Poor | Poor |
| Comparative Example 12 | Synthesis Example 8 | 390 | 4082 | 19.3 | Good | Poor | Poor |
| Comparative Example 13 | Synthesis Example 5 | 400 | 18502 | 1142.4 | Good | Good | Poor |
| Comparative Example 14 | Synthesis Example 9 | 390 | 2365 | 9.5 | Poor | — | — |

The invention claimed is:

1. An injection molded article comprising a copolymer comprising tetrafluoroethylene unit and a fluoro(alkyl vinyl ether) unit,
wherein a content of the fluoro(alkyl vinyl ether) unit of the copolymer is 4.7 to 7.0% by mass with respect to the whole of the monomer units,
a melt flow rate at 372° C. of the copolymer is 11.0 to 22.0 g/10 min,
a melting point of the copolymer is 296 to 305° C., and
an amount of fluorine ions dissolving out from the injection molded article into water is 7,500 μg/m$^2$ or lower.

2. The injection molded article according to claim 1, wherein the amount of fluorine ions dissolving out from the injection molded article into water is 5,500 μg/m$^2$ or lower.

3. The injection molded article according to claim 1, wherein an amount of metal dissolving out from the injection molded article into 50% by mass hydrofluoric acid is 200 μg/m$^2$ or lower.

4. The injection molded article according to claim 1, wherein the fluoro(alkyl vinyl ether) unit of the copolymer is perfluoro(propyl vinyl ether) unit.

5. The injection molded article according to claim 1, wherein the content of the fluoro(alkyl vinyl ether) unit of the copolymer is 4.9 to 6.6% by mass with respect to the whole of the monomer units.

6. The injection molded article according to claim 1, wherein the melt flow rate at 372° C. of the copolymer is 13.0 to 20.0 g/10 min.

7. The injection molded article according to claim 1, wherein the total number of —CF=CF$_2$, —CF$_2$H, —COF, —COOH, —COOCH$_3$, —CONH$_2$ and —CH$_2$OH of the copolymer is 20 or less per 10$^6$ main-chain carbon atoms.

8. The injection molded article according to claim 1, wherein the injection molded article is a nut.

9. A method for producing the injection molded article according to claim 1, comprising injection molding the copolymer using an injection molding machine provided with a cylinder and a screw accommodated in the cylinder, to obtain the injection molded article.

10. The production method according to claim 9, wherein the temperature of the copolymer in the cylinder is adjusted to 385 to 395° C.

11. The production method according to claim 9, wherein a Ni plated cylinder or a cylinder formed of a Ni-based alloy is used as the cylinder, and a screw formed of a Ni-based alloy and provided with a smear head on a head end is used as the screw.

* * * * *